(12) United States Patent
Kimura et al.

(10) Patent No.: US 11,791,116 B2
(45) Date of Patent: Oct. 17, 2023

(54) PROTECTING DEVICE AND BATTERY PACK

(71) Applicant: DEXERIALS CORPORATION, Tochigi (JP)

(72) Inventors: Yuji Kimura, Tochigi (JP); Chisato Komori, Tochigi (JP)

(73) Assignee: DEXERIALS CORPORATION, Tochigi (JP)

(*) Notice: Subject to any disclaimer, the term of this patent is extended or adjusted under 35 U.S.C. 154(b) by 0 days.

(21) Appl. No.: 17/638,603

(22) PCT Filed: Aug. 18, 2020

(86) PCT No.: PCT/JP2020/031181
§ 371 (c)(1),
(2) Date: Feb. 25, 2022

(87) PCT Pub. No.: WO2021/039508
PCT Pub. Date: Mar. 4, 2021

(65) Prior Publication Data
US 2022/0336173 A1    Oct. 20, 2022

(30) Foreign Application Priority Data

Aug. 29, 2019 (JP) ................................. 2019-157430

(51) Int. Cl.
*H01H 37/76* (2006.01)
*H01H 37/04* (2006.01)
*H01M 50/581* (2021.01)

(52) U.S. Cl.
CPC .......... *H01H 37/761* (2013.01); *H01H 37/04* (2013.01); *H01M 50/581* (2021.01)

(58) Field of Classification Search
CPC ...... H01H 37/761; H01H 37/04; H01H 85/06; H01H 85/46; H01H 37/76; H01H 85/046;
(Continued)

(56) References Cited

U.S. PATENT DOCUMENTS 8,203,420 B2    6/2012  Wiryana et al.
2017/0236667 A1* 8/2017  Furuuchi ............... H01H 37/761
                                                       327/525
(Continued)

FOREIGN PATENT DOCUMENTS

JP    2011-009222 A    1/2011
JP    2015-053260 A    3/2015
(Continued)

OTHER PUBLICATIONS

Kimura Takeo; Sato Koji; Yoneda Yoshihiro, "Protective Element and Battery Pack", Feb. 12, 2015, Dexerials Corp., Entire Document (Translation of WO 2015020111). (Year: 2015).*
(Continued)

*Primary Examiner* — Stephen S Sul
(74) *Attorney, Agent, or Firm* — Paratus Law Group, PLLC

(57) ABSTRACT

Provided are a protecting device capable of safely and quickly interrupting a current path by restricting heat absorption to a lower case, and a battery pack using the same. A protecting device includes: a meltable conductor 3; and a housing 6 including a lower case 4 and an upper case 5, the housing being formed by joining the lower case 4 and the upper case 5, and the lower case 4 is provided with a recessed portion 23 having support portions 21 provided at opposing side edges of the recessed portion 23 and hollow portions 22 provided on the side edges substantially orthogonal to the side edges of the recessed portion 23 on which the support portions 21 are provided.

25 Claims, 22 Drawing Sheets

(58) Field of Classification Search
CPC .. H01H 85/165; H01M 50/581; H01M 10/44; H01M 50/572; Y02E 60/10; H02H 7/18
See application file for complete search history.

(56) References Cited

U.S. PATENT DOCUMENTS

2018/0294124 A1* 10/2018 Chen ................... H01M 10/425
2018/0294126 A1* 10/2018 de Leon ................ H01H 85/18

FOREIGN PATENT DOCUMENTS

| JP | 2015-225786 A | 12/2015 | |
|---|---|---|---|
| JP | 2018-032525 A | 3/2018 | |
| WO | WO-2015020111 A1 * | 2/2015 | ............. H01H 37/76 |
| WO | WO-2015182354 A1 * | 12/2015 | ........... G01R 31/396 |

OTHER PUBLICATIONS

Kimura Takeo; Goto Kazuo; Sato Koji, "Protective Element and Battery Pack", Dec. 3, 2015, Dexerials Corp., Entire Document (Translation of WO 2015182354) (Year: 2015).*

* cited by examiner

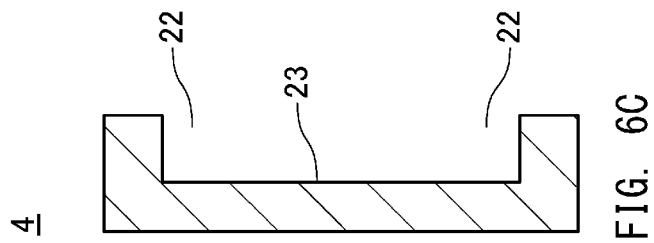
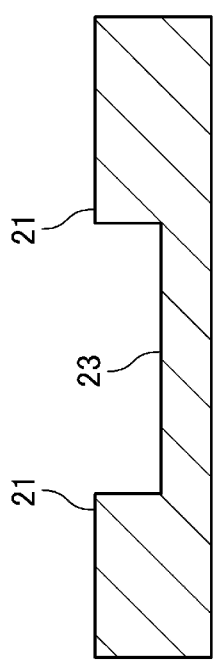
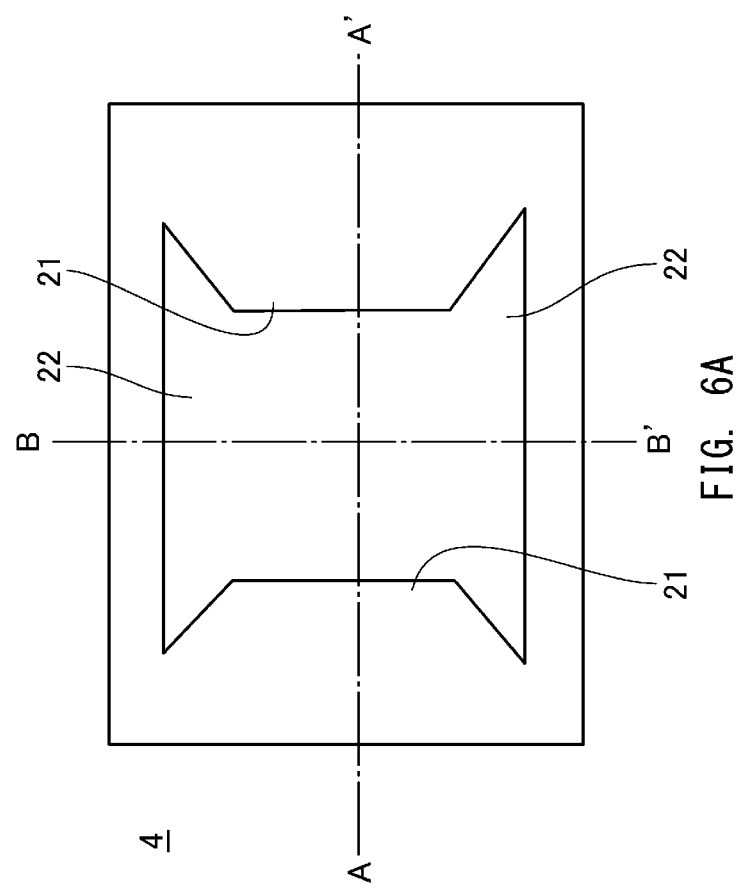

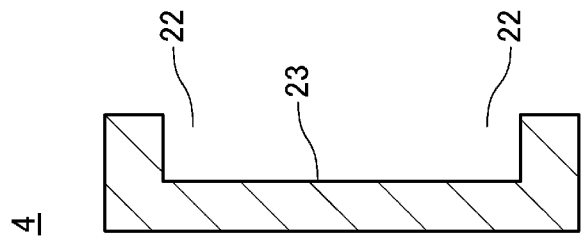
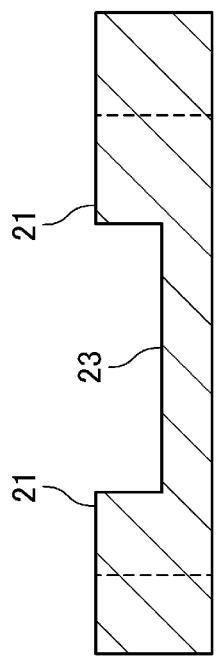
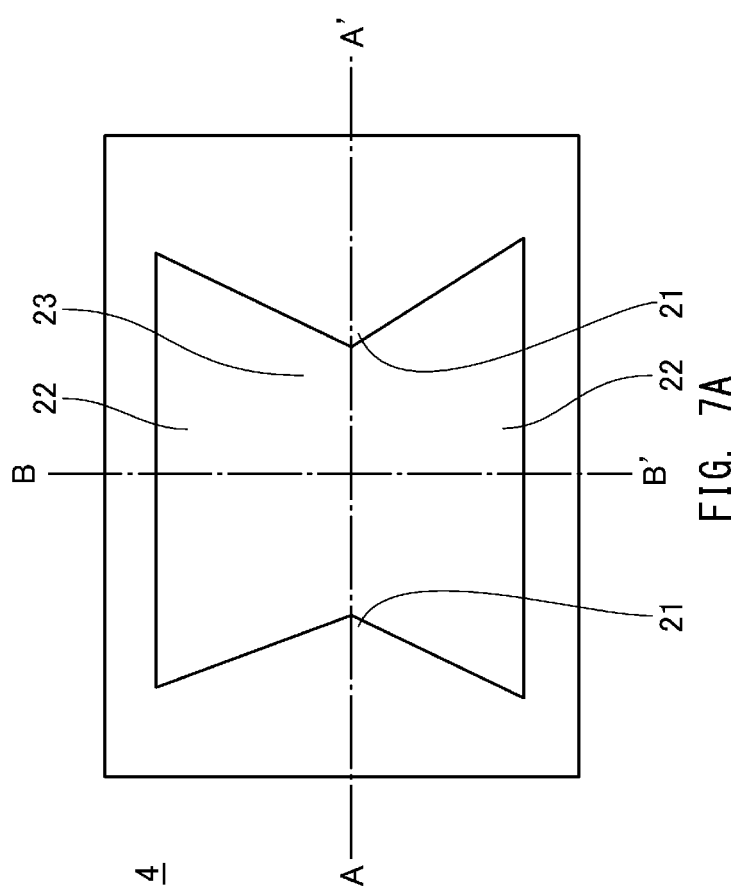

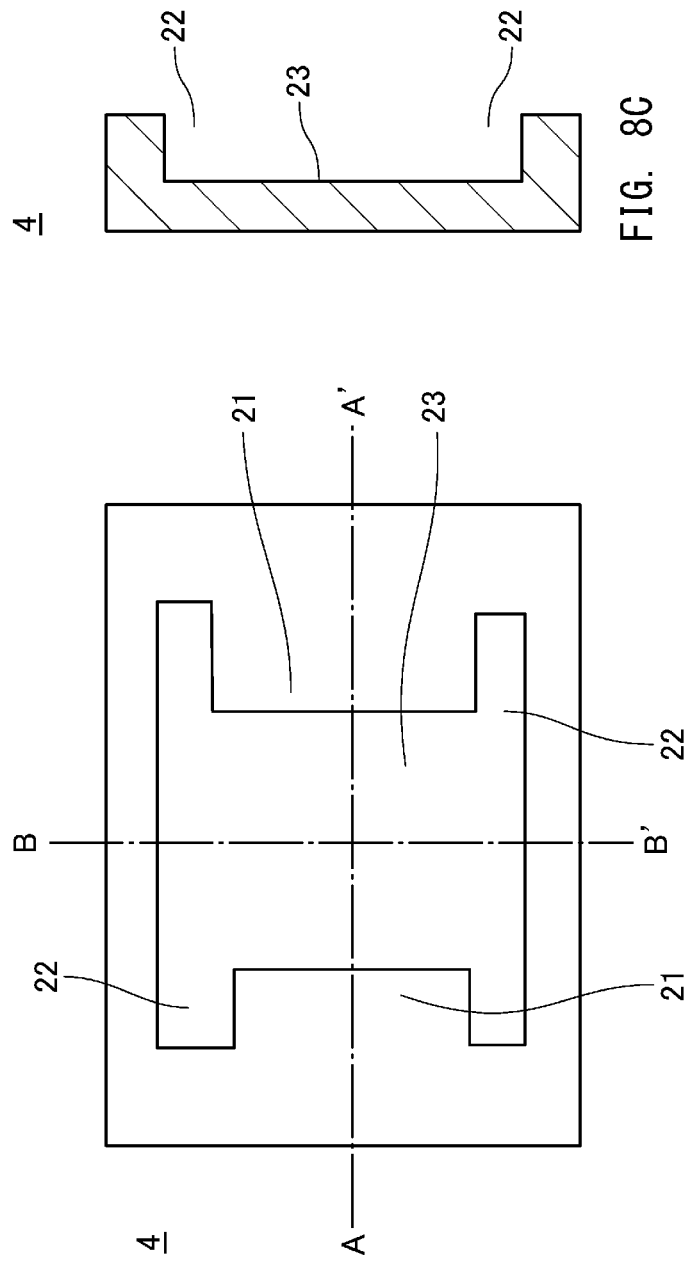

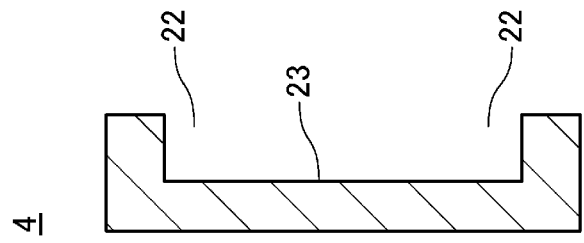
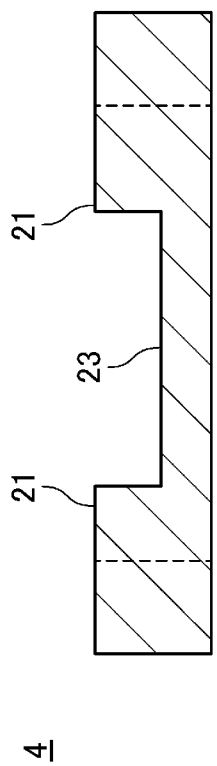
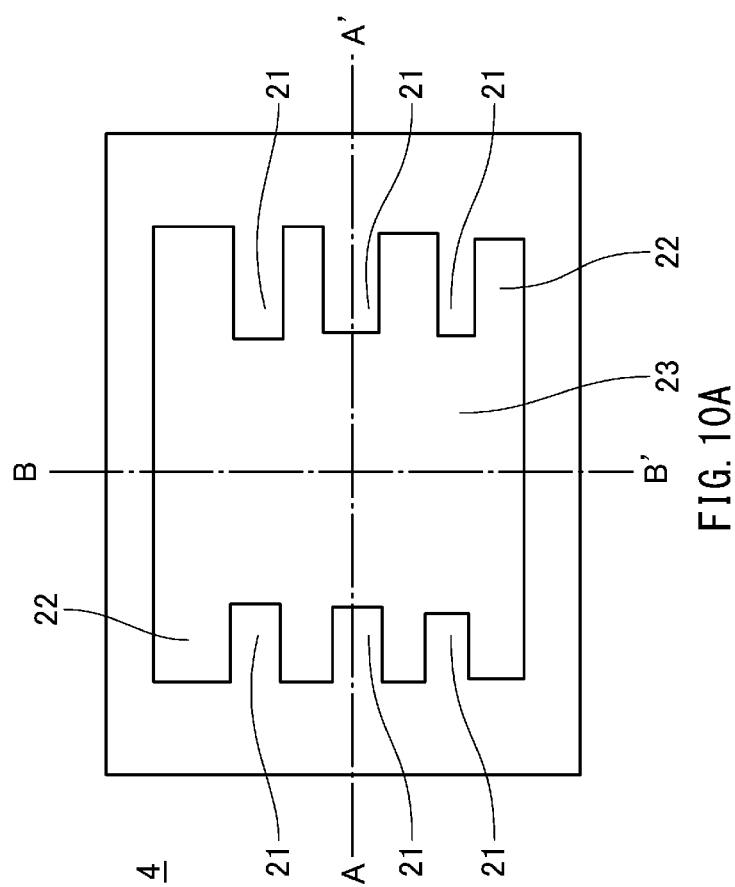

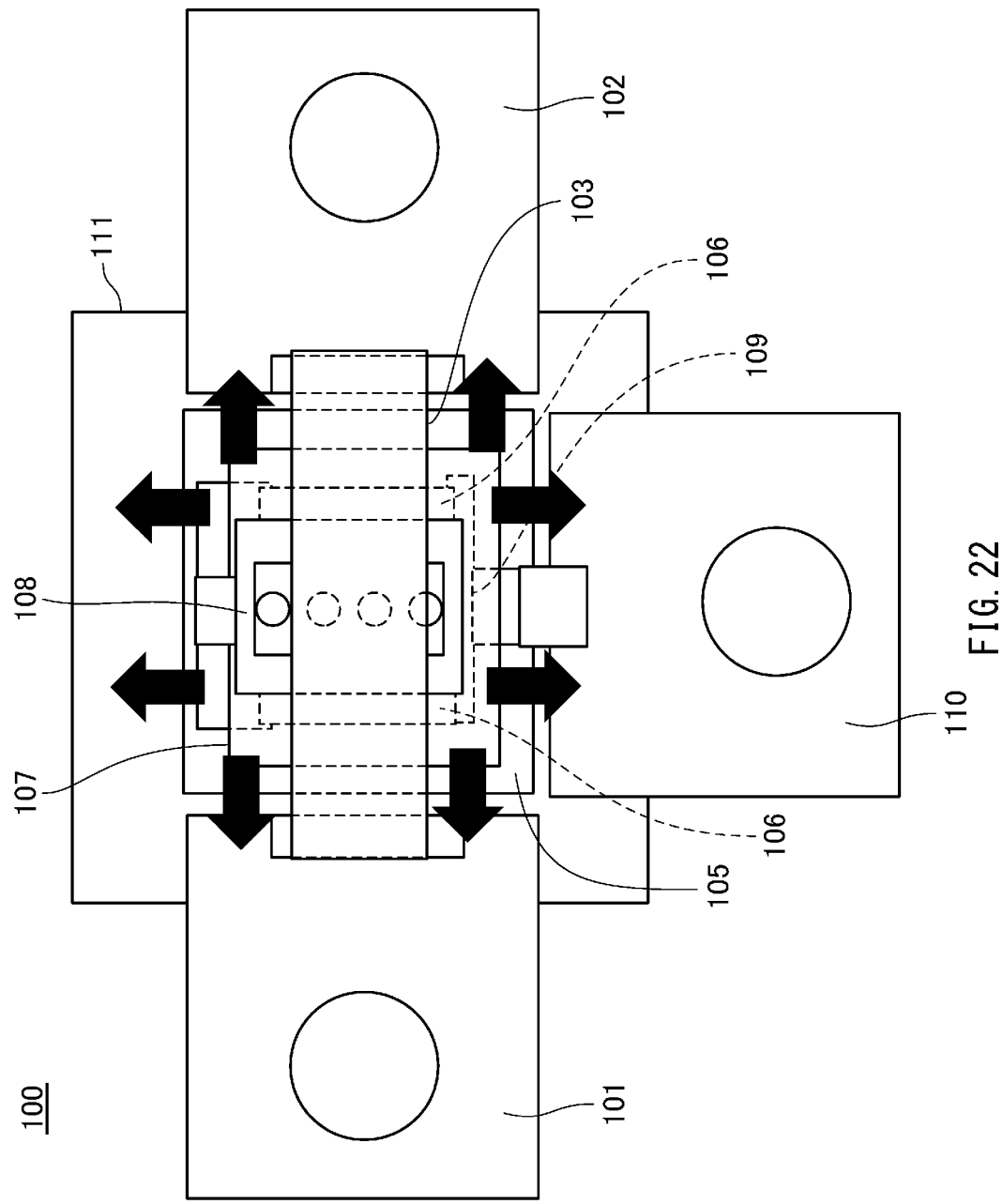

PROTECTING DEVICE AND BATTERY PACK

The present technology relates to a protecting device for interrupting a current path and a battery pack using the protecting device. This application is a National Stage Patent Application of PCT International Patent Application No. PCT/JP2020/031181, filed Aug. 18, 2020, under 35 U.S.C. § 371, which claims priority based on Japanese Patent Application No. 2019-157430, filed Aug. 29, 2019, in Japan, the entire contents of which are incorporated herein by reference.

TECHNICAL FIELD

The present technology relates to a protecting device for interrupting a current path and a battery pack using the protecting device. This application claims priority based on Japanese Patent Application No. 2019-157430, filed Aug. 29, 2019, in Japan, which is incorporated herein by reference.

BACKGROUND ART

Many of the secondary batteries that can be charged and reused are provided to users in the form of battery packs. In particular, in order to protect users and electronic appliances, lithium ion secondary batteries having a high volumetric energy density typically include several protective circuits incorporated in battery packs for over-charging protection and over-discharging protection to interrupt the output of the battery pack under predetermined conditions.

Many of electronic devices using lithium ion secondary batteries use an FET switch incorporated in a battery pack to turn ON/OFF the output, for over-charging protection or over-discharging protection of the battery pack. However, even in the cases of the FET switch being short-circuited and damaged for some reason, a large current caused by a surge such as lighting momentarily flowing, or an abnormally decreased output voltage or an excessively high output voltage occurring in an aged battery cell, the battery pack or the electronic appliance should prevent accidents including fire, among others. For this reason, a protecting device is used having a fuse element which interrupts a current path in accordance with an external signal so as to safely interrupt the output of the battery cell under these possible abnormalities.

As a protecting device of such a protective circuit for a lithium ion secondary battery, there is used a structure in which a heat-generator is provided inside the protecting device and a meltable conductor provided in a current path is blown by heat generation of the heat-generator.

CITATION LIST

Patent Literature

Patent Document 1: Japanese Unexamined Patent Application Publication No. 2015-53260

SUMMARY OF INVENTION

Technical Problem

Applications of lithium-ion secondary batteries have expanded in recent years, and they are being considered for use in larger current applications, such as electric power tools such as electric drivers, and transportation equipment such as hybrid cars, electric vehicles, and power-assisted bicycles, and some of them have begun to be used. In these applications, particularly at startup, a large current exceeding several tens to hundred Ampere may flow. It is desired to implement a protecting device compatible with such a large current capacity.

In order to implement a protecting device compatible with such a large current, there is proposed a protecting device including a meltable conductor having an increased sectional area and an insulating substrate having a heat-generator formed thereon and connected to a surface of the meltable conductor.

FIGS. 17 to 20 are views illustrating an example of a configuration of a protecting device for a high current application, in which FIG. 17 is a plan view, FIG. 18 is a D-D' cross-sectional view of FIG. 17, FIG. 19 is an external perspective view, and FIG. 20 is a plan view with the upper case omitted. A protecting device 100 shown in FIG. 17 includes a meltable conductor 103 connected between first and second external connection terminals 101, 102 that are connected to an external circuit such as a battery charge/discharge circuit to constitutes a part of the external circuit and interrupts the current path between the first external connection terminal 101 and the second external connection terminal 102 by melting the meltable conductor 103 when an abnormality such as an overvoltage occurs.

The protecting device 100 is provided with an insulating substrate 105, the first and second external connection terminals 101, 102 connected to the external circuit, two heat-generators 106 arranged in parallel on the surface of the insulating substrate 105, an insulating layer 107 covering the heat-generators 106, a front surface electrode 108 laminated on the insulating layer 107 and connected to the heat-generators 106, and the meltable conductor 103 mounted via solder paste over the first external connection terminal 101, the front surface electrode 108, and the second external connection terminal 102.

In the protecting device 100, the first and second external connection terminals 101, 102 are arranged from the inside to the outside of the device housing and are connected, by screwing or the like, to connection electrodes provided on an external circuit board on which the protecting device 100 is mounted, whereby the meltable conductor 103 is incorporated into a part of a current path formed on the external circuit board.

The heat-generator 106 is an electrically conductive member having a relatively high resistance value and generating heat when energized, and is made of, e.g., nichrome, W, Mo, Ru, or a material containing them. The heat-generator 106 is connected to a heat-generator feeding electrode 109 formed on the front surface of the insulating substrate 105. The heat-generator feeding electrode 109 is connected to a third external connection terminal 110 via solder paste. In the protecting device 100, the third external connection terminal 110 is connected to a connection electrode provided on the external circuit board on which the protecting device 100 is mounted, whereby the heat-generator 106 is connected to an external power source provided in the external circuit. The energization and heat generation of the heat-generator 106 is continuously controlled by, e.g., a switching element (not shown).

The heat-generator 106 is covered with the insulating layer 107 made of, e.g., a glass layer, and the front surface electrode 108 is formed on the insulating layer 107 so that the front surface electrode 108 is overlapped with the heat-generator 106 through the insulating layer 107. The meltable conductor 103 connected between the first and second external connection terminals 101, 102 is connected to the front surface electrode 108 via solder paste.

Thus, the heat-generator 106 and the meltable conductor 103 are overlapped and thermally connected, and the protecting device 100 can blow the meltable conductor 103 when the heat-generator 106 generates heat by energization.

The meltable conductor 103 may be formed of a low melting point metal such as Pb free solder or a high melting point metal such as Ag, Cu or an alloy containing these as main components, or may have a laminated structure of a low melting point metal and a high melting point metal. The meltable conductor 103 is connected from the first external connection terminal 101 to the second external connection terminal 102 across the front surface electrode 108, thereby constituting a part of the current path of the external circuit in which the protecting device 100 is incorporated. When a rate-exceeding current flows, the meltable conductor 103 is blown by self-heating (Joule heat) or by heat generation of the heat-generator 106, to interrupt the current path between the first and second external connection terminals 101, 102.

When it is necessary to interrupt the current path of the external circuit, a switching element energize the heat-generator 106 of the protecting device 100. As a result, the heat-generator 106 of the protecting device 100 is heated to a high temperature, and the meltable conductor 103 incorporated in the current path of the external circuit is blown. The meltable conductor 103 is blown by drawing melted material of the meltable conductor 103 to the front surface electrode 108 and the first and second external connection terminals 101, 102 having high wettability. Therefore, the protecting device 100 can interrupt the path from the first external connection terminal 101 via the front surface electrode 108 to the second external connection terminal 102, thereby interrupting the current path of the external circuit.

The protecting device 100 includes a lower case 111 and an upper case 112, and the lower case 111 and the upper case 112 are joined to constitute a housing 113 of the protecting device 100. The lower case 111 supports the insulating substrate 105, the first and second external connection terminals 101, 102, and the third external connection terminal 110. The upper case 112 forms a space for accommodating the above-described internal elements of the device.

However, as shown in FIGS. 21 and 22, the protecting device 100 cannot efficiently transfer heat to the meltable conductor 103 since the lower surface of the insulating substrate 105 is supported by the lower case 111 such that heat generated by the heat-generator 106 formed on the surface of the insulating substrate 105 tends to be absorbed into the lower case 111 through the insulating substrate 105. This tendency appears especially during low power operation and inhibits rapid blowout of the meltable conductor 103, making the blowout time unstable.

Also, when the meltable conductor 103 is blown due to self-heating caused by an overcurrent, the absorption of the heat by the lower case 111 via the insulating substrate 105 might inhibit rapid blowout.

Therefore, it is an object of the present invention to provide a protecting device capable of safely and quickly interrupting a current path by restricting heat absorption to a lower case, and a battery pack using the protecting device.

Solution to Problem

In order to solve the above problem, the protecting device according to the present technology includes: a meltable conductor; and a housing including a lower case and an upper case, the housing being formed by joining the lower case and the upper case, wherein the lower case is provided with a recessed portion formed therein, support portions provided at opposing side edges of the recessed portion, and hollow portions at side edges substantially orthogonal to the side edges on which the support portions are provided.

The battery pack according to the present technology includes: one or more battery cells; and a protecting device connected to a charge/discharge path of the battery cell to interrupt the charge/discharge path, wherein the protecting device comprises: a meltable conductor; and a housing including a lower case and an upper case, the housing being formed by joining the lower case and the upper case, wherein the lower case is provided with a recessed portion formed therein, support portions provided at opposing side edges of the recessed portion, and hollow portions at side edges substantially orthogonal to the side edges on which the support portions are provided.

Advantageous Effects of Invention

The present technology can prevent heat generated by the heat-generator from being absorbed into the lower case and efficiently transfer the heat of the heat-generator to the meltable conductor, thereby blowing the meltable conductor quickly.

BRIEF DESCRIPTION OF DRAWINGS

FIGS. 6A to 6C are views illustrating a lower case, in which FIG. 6A is a plan view, FIG. 6B is a cross-sectional view taken along line A-A', and FIG. 6C is a cross-sectional view taken along line B-B'.

FIGS. 7A to 7C are views illustrating a lower case provided with a support portion according to a modified example, in which FIG. 7A is a plan view, FIG. 7B is a cross-sectional view taken along line A-A', and FIG. 7C is a cross-sectional view taken along line B-B'.

FIGS. 8A to 8C are views illustrating a lower case provided with a support portion according to a modified example, in which FIG. 8A is a plan view, FIG. 8B is a cross-sectional view taken along line A-A', and FIG. 8C is a cross-sectional view taken along line B-B'.

FIGS. 9A to 9C are views illustrating a lower case provided with a support portion according to a modified example, in which FIG. 9A is a plan view, FIG. 9B is a cross-sectional view taken along line A-A', and FIG. 9C is a cross-sectional view taken along line B-B'.

FIGS. 10A to 10C are views illustrating a lower case provided with a support portion according to a modified example, in which FIG. 10A is a plan view, FIG. 10B is a cross-sectional view taken along line A-A', and FIG. 10C is a cross-sectional view taken along line B-B'.

FIG. 22 is a plan view illustrating a heat dissipation path in the protecting device shown in FIG. 17.

DESCRIPTION OF EMBODIMENTS

Figure 1:
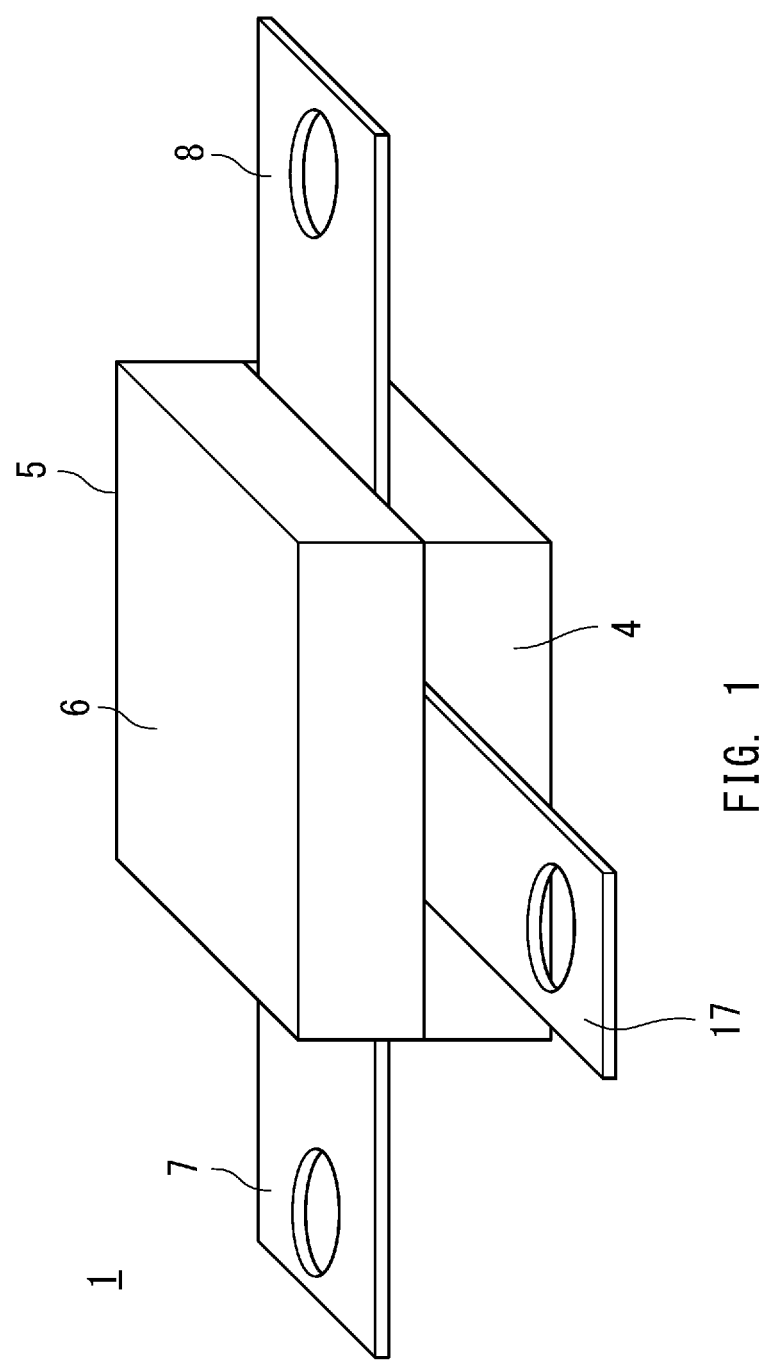
FIG. 1 is an external perspective view of a protecting device according to the present technology.
Figure 2:
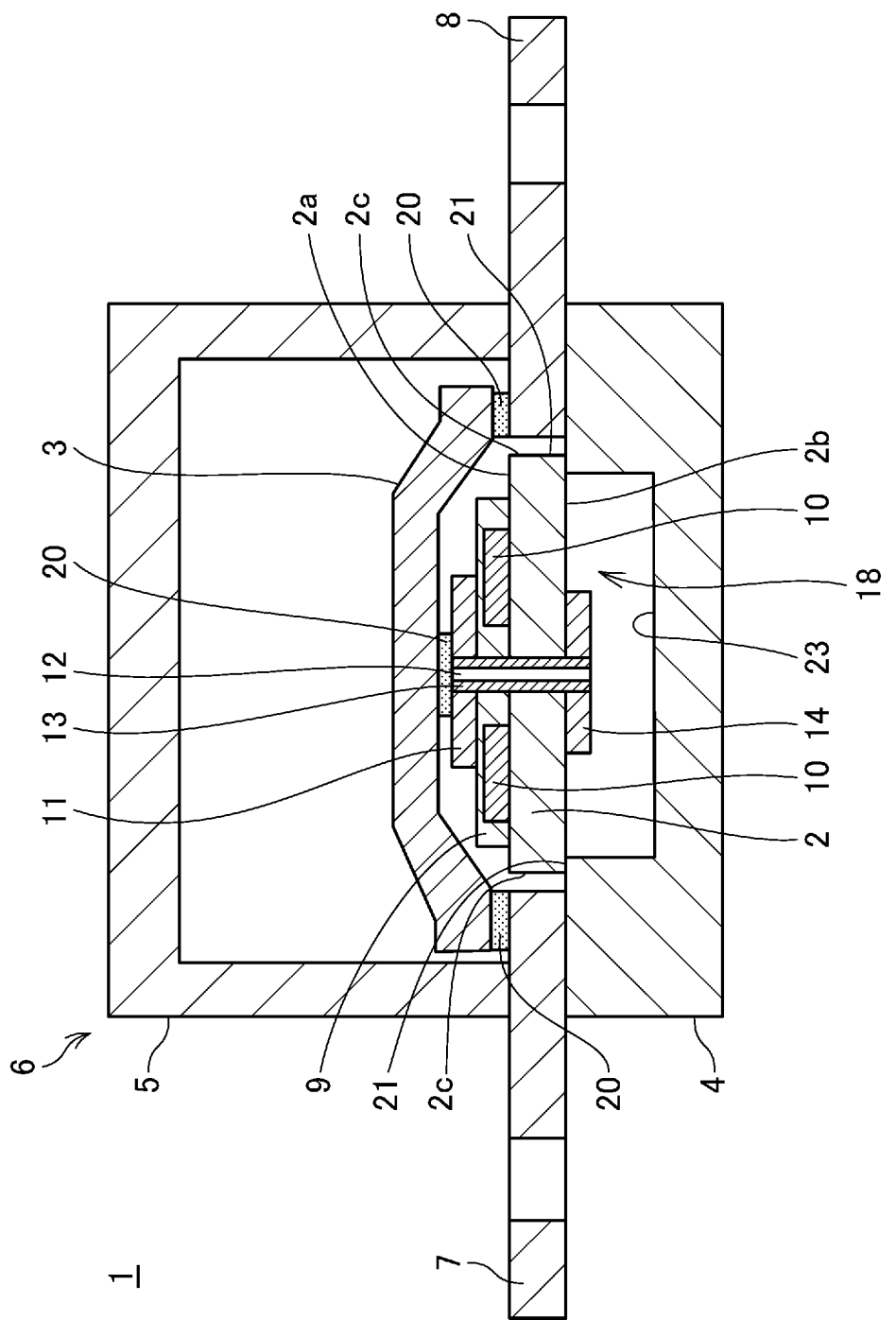
FIG. 2 is a cross-sectional view of a protecting device according to the present technology.

Embodiments of a protecting device and a battery pack according to the present technology will now be more particularly described with reference to the accompanying drawings. It should be noted that the present technology is not limited to the embodiments described below and various modifications can be added to the embodiment without departing from the scope of the present technology. The features shown in the drawings are illustrated schematically and are not intended to be drawn to scale. Actual dimensions should be determined in consideration of the following description. Moreover, those skilled in the art will appreciate that dimensional relations and proportions may be different among the drawings in some parts.

First Embodiment

FIGS. 1, 2, 3 and 4 illustrate a protecting device 1 according to the present technology. The protecting device 1 includes: an insulating substrate 2; a meltable conductor 3 mounted on a front surface of the insulating substrate 2; and a housing 6 including a lower case 4 supporting the rear surface of the insulating substrate 2 and an upper case 5 covering the front surface of the insulating substrate 2, the housing 6 being formed by joining the lower case 4 and the upper case 5 to accommodate the insulating substrate 2. The protecting device 1 further includes first and second external connection terminals 7, 8. The first and second external connection terminals 7, 8 are arranged from the inside to the outside of the housing 6 and are connected, by screwing or the like, to connection electrodes provided on an external circuit board on which the protecting device 1 is mounted. The first and second external connection terminals 7, 8 are supported by the lower case 4, and respective one ends thereof are connected by the meltable conductor 3. The protecting device 1 is incorporated into the external circuit via the first and second external connection terminals 7, 8, whereby the meltable conductor 3 constitutes a part of the current path of the external circuit, and the current path is blown by heat generation of a heat-generator 10 described later or rate-exceeding overcurrent.

Insulating Substrate

The insulating substrate 2 is formed of an insulating member such as alumina, glass ceramics, mullite, or zirconia. Alternatively, the insulating substrate 2 may be made of a material used for a printed wiring board such as a glass epoxy substrate or a phenol substrate. In the insulating substrate 2 shown in FIG. 3, both side edges in the extending direction of the meltable conductor 3 connected via a front surface electrode 11 to be described later are defined as first side edges 2c, and both side edges at which a heat-generator electrode 15 and a heat-generator feeding electrode 16 to be described later are formed are defined as second side edges 2d.

Heat-Generator

The heat-generator 10 for blowing the meltable conductor 3 is a conductive member having a relatively high resistance value to generate heat when energized, and is made of, e.g., nichrome, W, Mo, Ru, Cu, Ag, or an alloy containing these as main components. The heat-generator 10 can be formed by mixing the powder of the alloy, the composition, or the compound with a resin binder or the like to form a paste, forming a pattern of the paste on a front surface 2a of the insulating substrate 2 using a screen printing technique, and baking the paste.

The heat-generator 10 is provided on the front surface 2a of the insulating substrate 2 and covered with an insulating layer 9. On the insulating layer 9, the front surface electrode 11 to be described later is laminated. The insulating layer 9 is provided for protecting and insulating the heat-generator 10 and for efficiently transmitting heat of the heat-generator 10 to the front surface electrode 11 and the meltable conductor 3, and is made of, e.g., a glass layer.

One end of the heat-generator 10 is connected to the heat-generator electrode 15 formed on the front surface 2a of the insulating substrate 2. The heat-generator electrode 15 is connected to the front surface electrode 11 formed on the insulating layer 9. Thus, the heat-generator 10 is electrically connected to the meltable conductor 3 mounted on the front surface electrode 11. The other end of the heat-generator 10 is connected to the heat-generator feeding electrode 16. The heat-generator feeding electrode 16 is formed on the front surface 2a of the insulating substrate 2, is connected to a third external connection terminal 17 via a bonding material 20 such as solder paste, and is connected to the external circuit through the third external connection terminal 17. By connecting the protecting device 1 to the external circuit, the heat-generator 10 is incorporated into a power supply path to the heat-generator 10 formed in the external circuit via the third external connection terminal 17.

Figure 3:
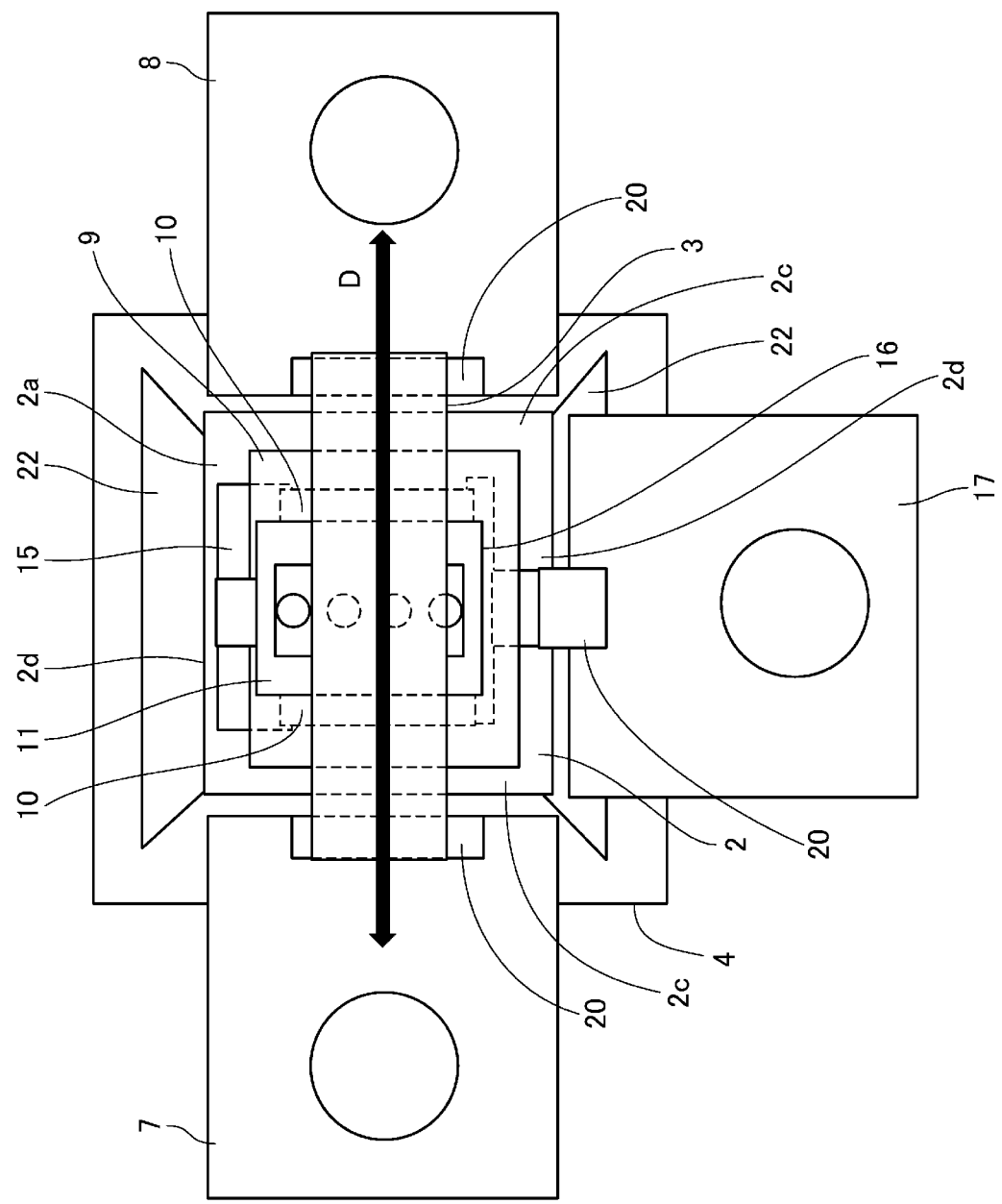
FIG. 3 is a plan view illustrating the protecting device according to the present technology with the upper case omitted.
Figure 4:
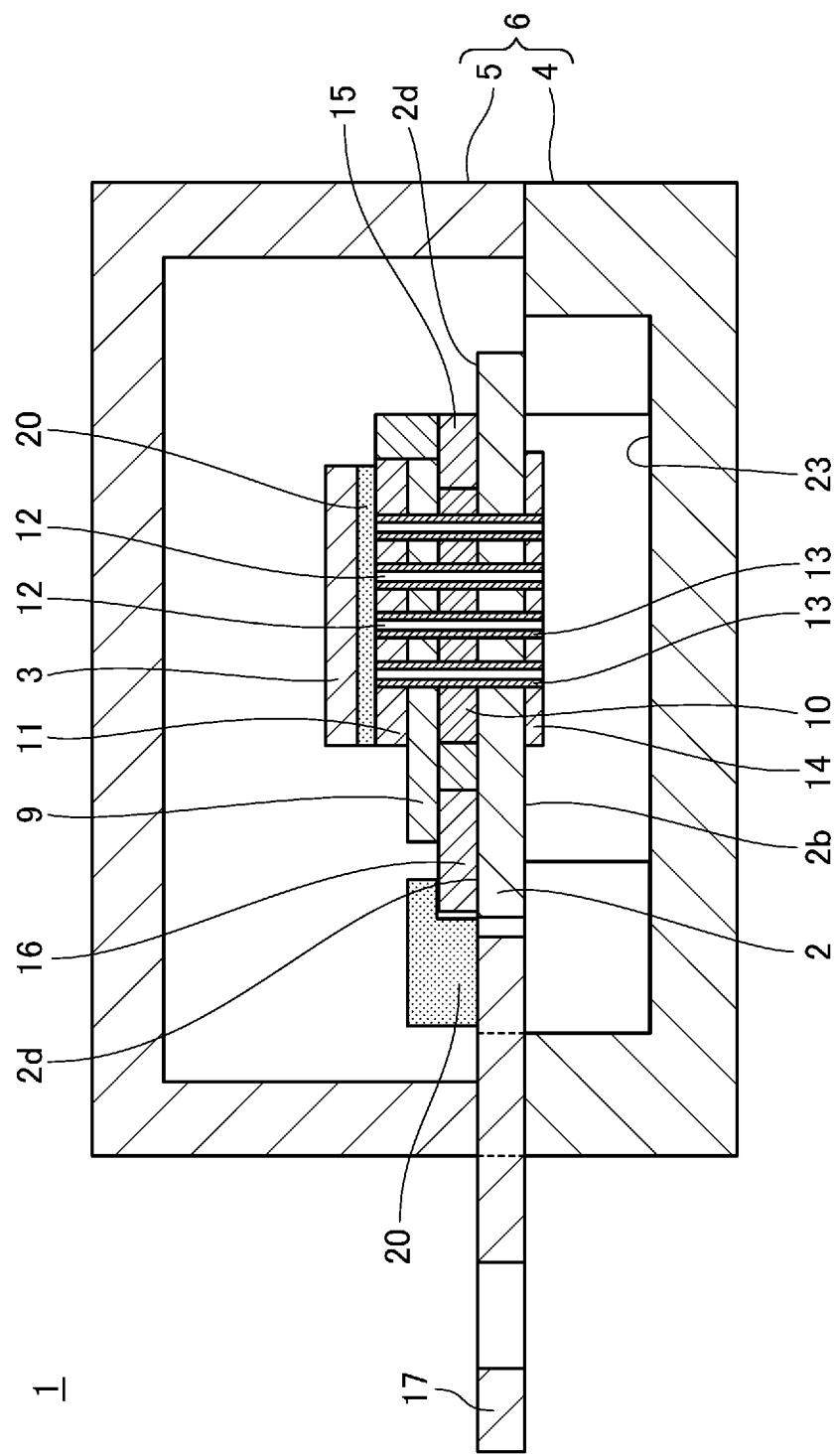
FIG. 4 is a cross-sectional view of a protecting device according to the present technology.

Further, as shown in FIG. 3, it is preferable that the heat-generator 10 is configured so that the current flow direction thereof intersects the current flow direction of the meltable conductor 3 indicated by arrow D in FIG. 3, and that the heat-generator electrode 15 and the heat-generator feeding electrode 16 are formed at the second side edges 2d in order to efficiently utilize the area of the insulating substrate 2.

A plurality of the heat-generators 10 may be formed on the surface of the insulating substrate 2. The example of the protecting device 1 shown in FIG. 3 is provided with two heat-generators 10. One end of each heat-generator 10 is connected to the heat-generator electrode 15, and the other end is connected to the heat-generator feeding electrode 16, so that the heat-generators 10 are electrically connected in parallel.

In the protecting device 1, the heat-generator 10 may be formed inside the insulating layer 9 laminated on the front surface 2a of the insulating substrate 2. In the protecting device 1, the heat-generator 10 may be formed inside the insulating substrate 2. Alternatively, in the protecting device 1, the heat-generator 10 may be formed on a rear surface 2b of the insulating substrate 2. When the heat-generator 10 is formed on the rear surface 2b of the insulating substrate 2, one end of the heat-generator 10 is connected to the rear surface electrode formed on the rear surface 2b of the insulating substrate 2, and is electrically connected to the meltable conductor 3 mounted on the front surface electrode 11 via a conductive through-hole for connecting the rear surface electrode and the front surface electrode 11. The other end of the heat-generator 10 is connected to the third external connection terminal 17 via a heat-generator feeding electrode formed on the rear surface 2b of the insulating substrate 2.

Front Surface Electrode

The front surface electrode 11 connected to the heat-generator 10 via the heat-generator electrode 15 and connected to the meltable conductor 3 is formed on the insulating layer 9. The front surface electrode 11 is connected to the meltable conductor 3 via the bonding material 20 such as solder paste. When the meltable conductor 3 melts, the melted conductor 3a is aggregated on the front surface electrode 11 to blow the meltable conductor 3.

The front surface electrode 11 may be provided with a suction hole 12. When the meltable conductor 3 melts, the suction hole 12 sucks the melted conductor 3a by a capillary phenomenon, thereby reducing the volume of the melted conductor 3a held on the front surface electrode 11 (see FIG. 5). The protecting device 1 can reduce the volume of the melted conductor 3a by sucking the melted conductor 3a into the suction hole 12 even when the amount of the melted conductor 3a is increased by increasing the cross-sectional area of the meltable conductor 3 in order to be compatible with a large current application. The insulating substrate 2 having such a configuration constitutes a blowout member 18 in which the energized heat-generator 10 generates heat to melt the meltable conductor 3, and the melted conductor 3a is sucked into the suction hole 12 to blow the melted conductor 3a.

Thus, the protecting device 1 can reduce the volume of the melted conductor 3a held on the front surface electrode 11 to more reliably insulate the first and second external connection terminals 7, 8, reduce scattering of the melted conductor 3a due to arc discharge generated when the meltable conductor 3 is melted to prevent reduction in insulation resistance, and prevent short circuit failure which might be caused by adhesion of the meltable conductor 3 to the peripheral circuit around the mounting position thereof.

The inner surface of the suction hole 12 is provided with a conductive layer 13 formed thereon. By forming the conductive layer 13, the suction hole 12 facilitates suction of the melted conductor 3a. The conductive layer 13 is formed of, e.g., any one of copper, silver, gold, iron, nickel, palladium, lead, tin, or an alloy containing any one of them as a main component and can be formed on the inner surface of the suction hole 12 by known methods such as electroplating or printing of conductive paste. The conductive layer 13 may be formed by inserting a plurality of metal wires or an aggregate of conductive ribbons into the suction hole 12.

The suction hole 12 is preferably formed as a through hole penetrating in the thickness direction of the insulating substrate 2. Thus, the suction hole 12 can suck the melted conductor 3a up to the side of the rear surface 2b of the insulating substrate 2, thereby sucking more amount of the melted conductor 3a to reduce the volume of the melted conductor 3a at the melting portion. The suction hole 12 may be formed as a non-through hole.

The conductive layer 13 of the suction hole 12 is continuous with the front surface electrode 11 formed on the front surface 2a of the insulating substrate 2. The front surface electrode 11 supports the meltable conductor 3 and aggregates the melted conductor 3a thereon, and the front surface electrode 11 and the conductive layer 13 are continuous, so that the melted conductor 3a can be easily guided into the suction hole 12.

By heating the conductive layer 13 and the front surface electrode 11 by the heat-generator 10, the melted conductor 3a of the meltable conductor 3 can be easily sucked into the suction hole 12 and can be easily aggregated on the front surface electrode 11. Therefore, the protecting device 1 can promote the action of sucking the melted conductor 3a from the front surface electrode 11 to the suction hole 12 via the conductive layer 13 to surely blow the meltable conductor 3.

There may be formed a rear surface electrode 14 connected to the conductive layer 13 of the suction hole 12 on the rear surface 2b of the insulating substrate 2. Since the rear surface electrode 14 is continuous with the conductive layer 13, when the meltable conductor 3 is melted, the melted conductor 3a moved through the suction hole 12 is aggregated thereon (see FIG. 5). Thus, the protecting device 1 can suck more amount of the melted conductor 3a and reduce the volume of the melted conductor 3a at the melting portion.

It should be noted that, forming a plurality of suction holes 12 in the protecting device 1 can increase the number of paths for sucking the melted conductor 3a of the meltable conductor 3 to suck more amount of melted conductor 3a, thereby reducing the volume of the melted conductor 3a at the melting portion. In this case, the plurality of suction holes 12 may be formed across the width direction of the meltable conductor 3 in which the front surface electrode 11 and the meltable conductor 3 overlap. The suction hole 12 may also be formed in a region of the front surface electrode 11 which does not overlap with the meltable conductor 3 and over which the melted conductor 3a will be made wet and spread.

When providing the two heat-generators 10 in parallel, in any case where the heat-generators are formed on the front surface 2a, the rear surface 2b, or the inside of the insulating substrate 2, it is preferable to form the heat-generators on both sides of the suction hole 12 in order to heat the front surface electrode 11 and the rear surface electrode 14 and to suck and aggregate more amount of melted conductor 3a.

Housing

Next, the housing 6 of the protecting device 1 will be described. The housing 6 is formed by joining the lower case 4 and the upper case 5. The housing 6 may be formed of an insulating member such as various engineering plastics, thermoplastic plastics, and ceramics, among others. The housing 6 has an internal space over the front surface 2a of the insulating substrate 2 sufficient for the meltable conductor 3 to expand spherically upon melting and for the melted conductor 3a to aggregate on the front surface electrode 11 and the first and second external connection terminals 7, 8.

Lower Case

FIGS. 6A to 6C are views illustrating the lower case 4, in which FIG. 6A is a plan view, FIG. 6B is a cross-sectional view taken along line A-A', and FIG. 6C is a cross-sectional view taken along line B-B'. The lower case 4 is formed in a substantially rectangular shape and includes support portions 21 for supporting the first side edges 2c of the insulating substrate 2 located at both ends thereof opposed in the current flow direction of the meltable conductor 3 to cross (intersect) the current direction, and hollow portions 22 for holding the second side edges 2d different from the first side edges 2c of the insulating substrate 2 in a bridge-like manner.

In the protecting device 1 shown in FIG. 3, the insulating substrate 2 is formed in a rectangular shape and includes a pair of the first side edges 2c crossing the current flow direction of the meltable conductor 3 and a pair of the second side edges 2d respectively adjacent to and orthogonal to the first side edges 2c. The lower case 4 supports the first side edges 2c of the insulating substrate 2 by the support portions 21 and holds the second side edges 2d in a bridge-like manner by the hollow portions 22. Thus, the protecting device 1 can prevent the heat generated by the heat-generator 10 formed on the insulating substrate 2 from being absorbed into the lower case 4 through the insulating substrate 2 and can efficiently transfer the heat of the heat-generator 10 to the meltable conductor 3 to quickly blow the meltable conductor 3. As a result, the protecting device 1 can suppress variation in the blowout time and stably blow the meltable conductor 3 in a short time.

In particular, as shown in FIG. 3, in the protecting device 1, heat is concentrated in the heat-generator electrode 15 connecting the heat-generator 10 and the front surface electrode 11. Furthermore, in the protecting device 1, heat is also concentrated in the heat-generator feeding electrode 16 connecting the heat-generator 10 and the third external connection terminal 17. Therefore, if the second side edges 2d on which the heat-generator electrode 15 and the heat-generator feeding electrode 16 are formed were in contact with the lower case 4, a large amount of heat would be dissipated therethrough. With this regard, the protecting device 1 can efficiently transfer heat to the meltable conductor 3 by holding the second side edges 2d in a bridge-like manner to eliminate the heat absorption path to the lower case 4.

Figure 5:
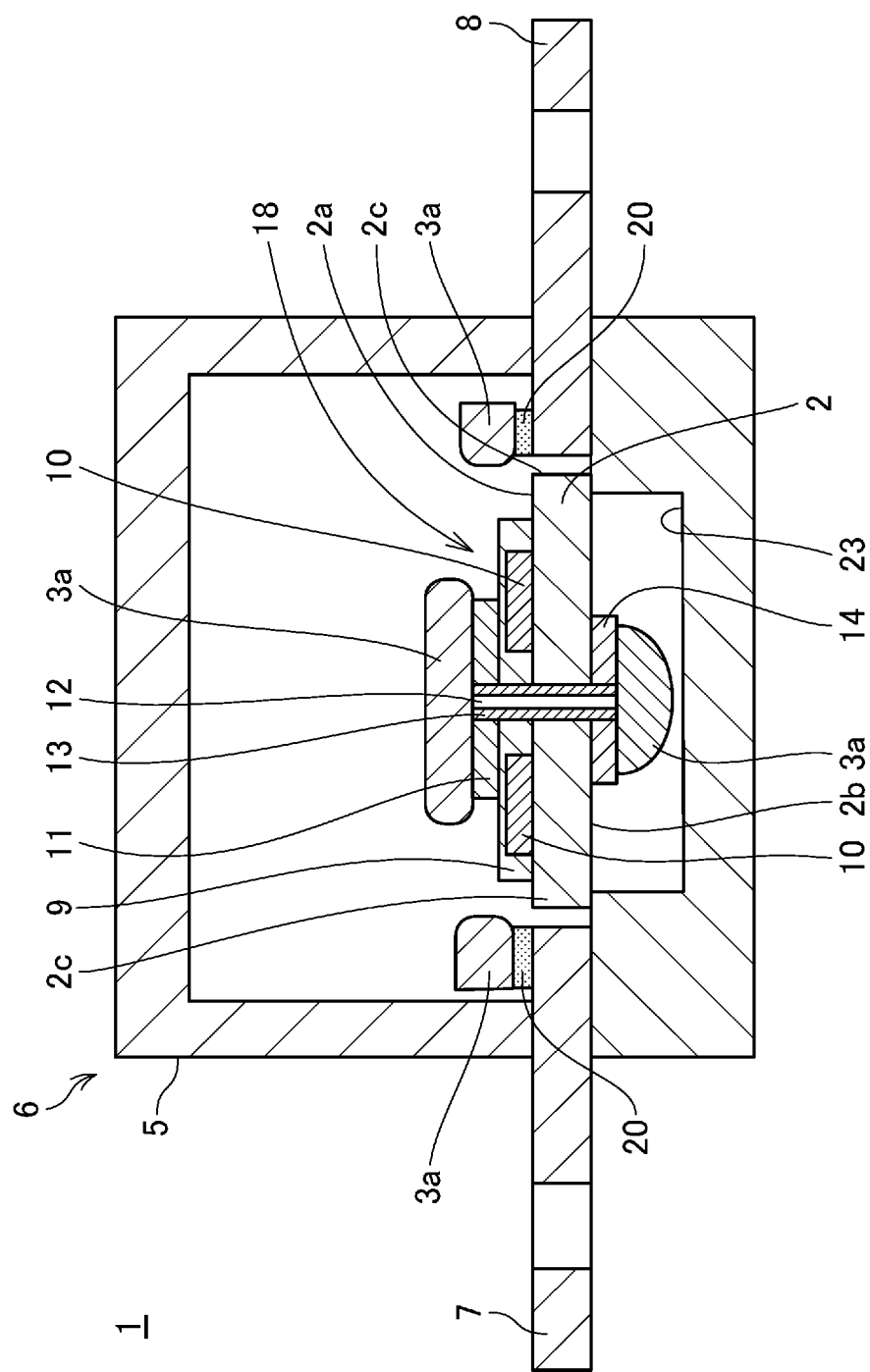
FIG. 5 is a cross-sectional view illustrating a state in which a meltable conductor is blown in a protecting device according to the present technology.

In addition, the protecting device 1 can further improve the insulating property by supporting the first side edges 2c crossing the current flow direction of the meltable conductor 3 of the insulating substrate 2 by the lower case 4. In other words, as shown in FIG. 5, the first side edges 2c of the insulating substrate 2 are located at both ends in the current flow direction of the meltable conductor 3 so that melted material of the meltable conductor 3 is separated between the front surface electrode 11 and the ends of the first and second external connection terminals 7, 8. Therefore, the first side edges 2c of the insulating substrate 2 need to promote heat dissipation (radiation) and prevent wet spreading of the melted conductor to ensure insulation. With this regard, the protecting device 1 supports the first side edges 2c on the lower case 4 to promote heat dissipation to the lower case 4, thereby improving insulation property after blowout.

As shown in FIGS. 6A to 6C, the hollow portions 22 can be formed by providing a recessed portion 23 on the surface of the lower case 4 supporting the insulating substrate 2. The recessed portion 23 has a pair of opposing side edges protruding inward which serve as the support portions 21 for supporting the first side edges 2c of the insulating substrate 2. The recessed portion 23 is formed so that the width between the side edges substantially orthogonal to the side edges provided with the support portions 21 is longer than the width between the second side edges 2d of the insulating substrate 2 so as to hold the second side edges 2d of the insulating substrate 2 supported by the support portions 21 in a bridge-like manner (FIG. 3).

The hollow portions 22 are preferably longer than the length of the second side edges 2d of the insulating substrate 2 in the current flow direction of the meltable conductor 3. This allow the hollow portions 22 to surely hold the second side edges 2d in a bridge-like manner, thereby suppressing heat conduction to the lower case 4.

Form of Support Portion

The form of the support portions 21 will now be described. The recessed portion 23 may have any shape as long as the recessed portion 23 is shorter than the distance between the first side edges 2c of the insulating substrate 2 in the direction between the first side edges and can support the first side edges 2c of the insulating substrate 2 in plan view. For example, as shown in FIG. 6, the support portions 21 may be formed in a substantially trapezoidal shape in which the short side protrudes into the recessed portion 23. As shown in FIG. 3, the length of the short side of the substantially trapezoidal support portions 21 is substantially the same as that of the first side edges 2c of the insulating substrate 2 and gradually widens toward the bottom side. Further, as shown in FIG. 7, the support portions 21 may be formed in a substantially triangular shape in which the top portion protrudes into the recessed portion 23 in plan view. The support portions 21 shown in FIGS. 3 and 7A to 7C can stably support the insulating substrate 2 by gradually increasing the support area toward the first side edges 2c and can dissipate the heat of the heat-generator 10 to the lower case 4.

Figure 9C:
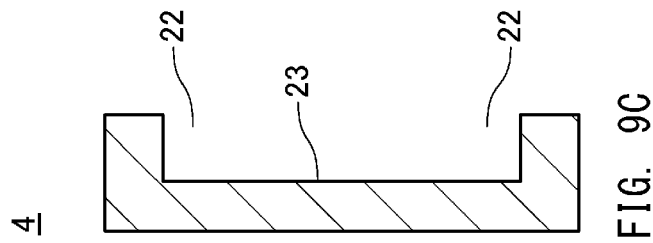
Figure 9B:
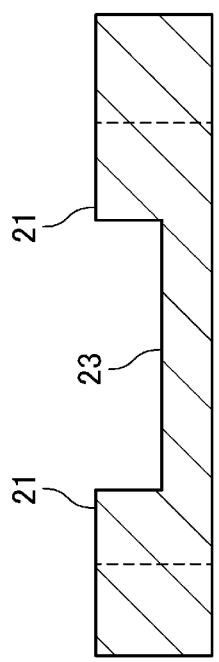
Figure 9A:
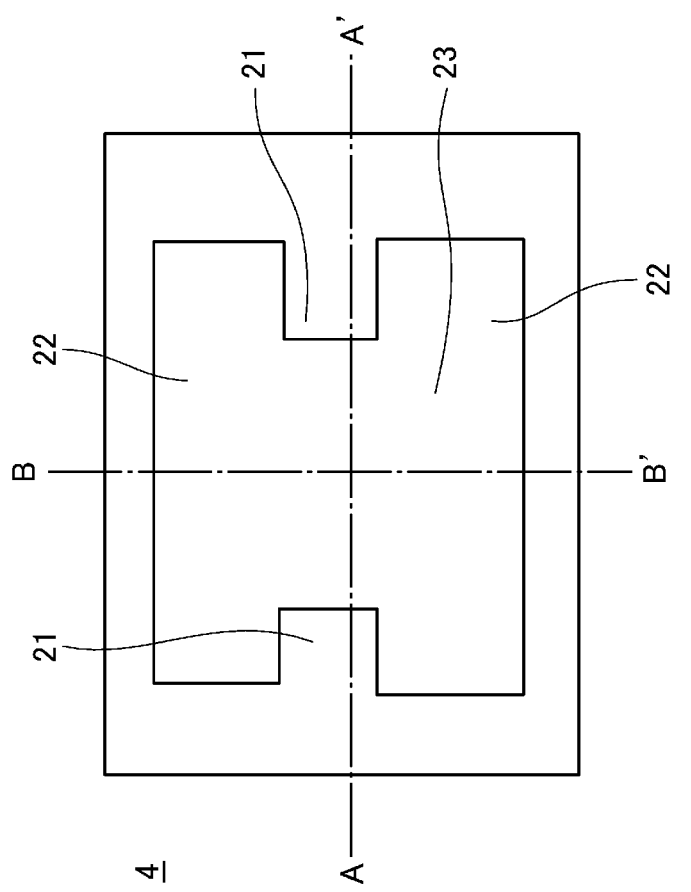

Further, as shown in FIGS. 8A to 8C, the support portions 21 may be formed in a substantially rectangular shape. Alternatively, as shown in FIGS. 9A to 9C, the support portions 21 may be formed to have protruding portions that protrude into the recessed portion 23 at a position corresponding to an approximately central positions of the first side edges 2c of the insulating substrate 2. Further, as shown in FIGS. 10A to 10C, the support portions 21 may have a plurality of protrusions intermittently arranged in parallel along the first side edges 2c of the insulating substrate 2. In the configuration shown in FIGS. 10A to 10C, each of the protrusions are formed in the same shape, but they may be formed in different shapes, e.g., by making the central protrusion relatively long.

In any form, it is preferable that the support portions 21 are not formed up to a position overlapping with the heat-generator 10. This is because, if the support portions 21 were overlapped with the heat-generator 10, the heat of the heat-generator 10 would be excessively transmitted to the support portions 21, which would increase the adverse effect of inhibiting the heating of the meltable conductor 3.

Upper Case

The upper case 5 is formed in a substantially rectangular shape as with the lower case 4, and abut on and joined with the lower case 4 to constitute the housing 6. The upper case 5 covers the meltable conductor 3 formed on the front surface 2a of the insulating substrate 2 and the first and second external connection terminals 7, 8, and has an internal space in which the melted conductor 3a can be aggregated on the front surface electrode 11 and the first and second external connection terminals 7, 8. The lower case 4 and the upper case 5 may be bonded using a known adhesive.

The upper case 5 is provided with recesses, which are formed on the lower end surfaces of the side wall abutting the lower case 4, for arranging the first and second external connection terminals 7, 8 and the third external connection terminal 17 supported by the lower case 4 from the inside to the outside of the housing 6. The recesses are formed at positions corresponding to the arrangement positions of the first and second external connection terminals 7, 8 and the third external connection terminal 17, and have respective shapes corresponding to the shapes of the first and second external connection terminals 7, 8 and the third external connection terminal 17. Thus, the lower case 4 and the upper case 5 of the housing 6 can be brought into contact and joined without gaps, with the first and second external connection terminals 7, 8 and the third external connection terminal 17 being led out of the housing.

Meltable Conductor

Next, the meltable conductor 3 will be described. The meltable conductor 3 is mounted between the first and second external connection terminals 7, 8, and blown due to heat generation by the energization of the heat-generator 10 or due to self-heat generation (Joule heat) by a rate-exceeding current flowing therethrough, to interrupt the current path between the first external connection terminal 7 and the second external connection terminal 8.

The meltable conductor 3 may be a conductive material which melts due to heat generation by energization of the heat-generator 10 or an overcurrent state, and for example, may be made of SnAgCu-based Pb-free solder as well as a BiPbSn alloy, a BiPb alloy, a BiSn alloy, a SnPb alloy, a PbIn alloy, a ZnAl alloy, an InSn alloy, and a PbAgSn alloy, among other materials.

Figure 11:
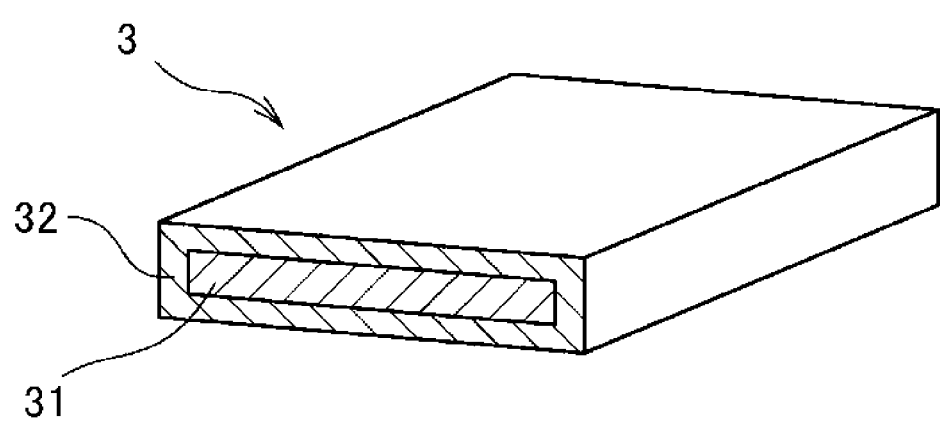
FIG. 11 is an external perspective view of a meltable conductor.

The meltable conductor 3 may have a structure having a high melting point metal and a low melting point metal. For example, as shown in FIG. 11, the meltable conductor 3 may have a laminated structure consisting of an inner layer and an outer layer and may include a low melting point metal layer 31 as the inner layer and a high melting point metal layer 32 as the outer layer laminated on the low melting point metal layer 31. The meltable conductor 3 is connected to the first and second external connection terminals 7, 8 and on the front surface electrode 11 through the bonding material 20 such as solder paste.

The low melting point metal layer 31 is preferably a solder or Sn based metal and is generally referred to as "Pb free solder". The melting point of the low melting point metal layer 31 may have a melting point lower than the temperature of the reflow furnace and may melt at about 200° C. The high melting point metal layer 32 is a metal layer laminated on the surface of the low melting point metal layer 31, made of, for example, Ag or Cu, or a metal containing any of these as a main component, and has a high melting point so as not to melt at the time of reflow process performed to connect the first and second external connection terminals 7, 8 and the front surface electrode 11 to the meltable conductor 3.

This meltable conductor 3 can be formed by forming a high melting point metal layer on a low melting point metal foil using a plating technique or can be formed by using other well-known lamination techniques or film-forming techniques. In this case, the meltable conductor 3 may have a structure in which the entire surface of the low melting point metal layer 31 is covered with the high melting point metal layer 32 or may have a structure in which the entire surface of the low melting point metal layer is covered except for a pair of opposing side surfaces. The meltable conductor 3 may be formed in various configurations, such as a structure having the high melting point metal layer 32 as an inner layer and the low melting point metal layer 31 as an outer layer, a multi-layer structure having three or more layers in which low melting point metal layers and high melting point metal layers are alternately laminated, or a structure in which a part of the inner layer is exposed by providing an opening in a part of the outer layer.

By laminating the high melting point metal layer 32 as an outer layer on the low melting point metal layer 31 as an inner layer, the meltable conductor 3 can maintain the shape as the meltable conductor 3 even when the reflow temperature exceeds the melting temperature of the low melting point metal layer 31 and will not be blown. Therefore, in the protecting device 1, the first and second external connection terminals 7, 8 and the front surface electrode 11 can be efficiently connected to the meltable conductor 3 by reflow. In addition, the protecting device 1 can prevent changes in blowout properties, which might otherwise cause a problem in which the meltable conductor 3 might be deformed to locally increase or decrease the resistance value so that it cannot be blown at a predetermined temperature or will be blown below a predetermined temperature.

The meltable conductor 3 does not melt due to self-heating while a predetermined rated current flows. When a current exceeding the rated value flows, the meltable conductor 3 melts due to self-heating and interrupts the current path between the first and second external connection terminals 7, 8. Further, when the heat-generator 10 is energized and generates heat, the meltable conductor 3 is blown to interrupt the current path between the first and second external connection terminals 7, 8.

In this case, in the meltable conductor 3 the melted low melting point metal layer 31 erodes the high melting point metal layer 32 (solder erosion), whereby the high melting point metal layer 32 melts at a temperature lower than the melting temperature thereof. Thus, the meltable conductor 3 can be blown in a short time by utilizing the erosion action on the high melting point metal layer 32 by the low melting point metal layer 31. Further, since the melted conductor 3*a* of the meltable conductor 3 is separated by the physical drawing action of the front surface electrode 11 and the first and second external connection terminals 7, 8, the current path between the first and second external connection terminals 7, 8 can be quickly and reliably interrupted (FIG. 5).

In the meltable conductor 3, the volume of the low melting point metal layer 31 is preferably larger than that of the high melting point metal layer 32. The meltable conductor 3 is heated by self-heating by an overcurrent or heat generated by the heat-generator 10, and the low melting point metal melts and erodes the high melting point metal, so that the meltable conductor 3 can melt and interrupt the path quickly. Therefore, by forming the volume of the low melting point metal layer 31 larger than the volume of the high melting point metal layer 32, the meltable conductor 3 can promote the erosive action and can quickly interrupt the path between the first and second external connection terminals 7, 8.

Further, since the meltable conductor 3 is constituted by laminating the high melting point metal layer 32 on the low melting point metal layer 31 serving as an inner layer, the blowout temperature can be significantly decreased as compared with conventional chip fuses or the like made of a high melting point metal. Therefore, the meltable conductor 3 can be formed to have a cross-sectional area larger than a chip fuse or the like of the same size, thereby greatly improving the current rating. Further, the meltable conductor 3 can be made smaller and thinner than a conventional chip fuse having the same current rating and is excellent in rapid blowout property.

In addition, the meltable conductor 3 can improve tolerance to a surge (pulse tolerance) which would occur when an abnormally high voltage is momentarily applied to the electric system incorporating the protecting device 1. For example, the meltable conductor 3 should not be blown in the case of a current of 100 A flowing for a few milliseconds. In this respect, since the large current flowing in an extremely short time flows through the surface layer of the conductor (skin effect), and the meltable conductor 3 is provided with the high melting point metal layer 32 such as Ag plating having a low resistance value as an outer layer, a current caused by a surge can easily flow to prevent blowout due to self-heating. Therefore, the meltable conductor 3 can significantly improve serge tolerance as compared with conventional fuses made of solder alloys.

The meltable conductor 3 may be coated with a flux (not shown) for preventing oxidation and improving wettability at the time of blowout.

Circuit Configuration Example

Figure 12:
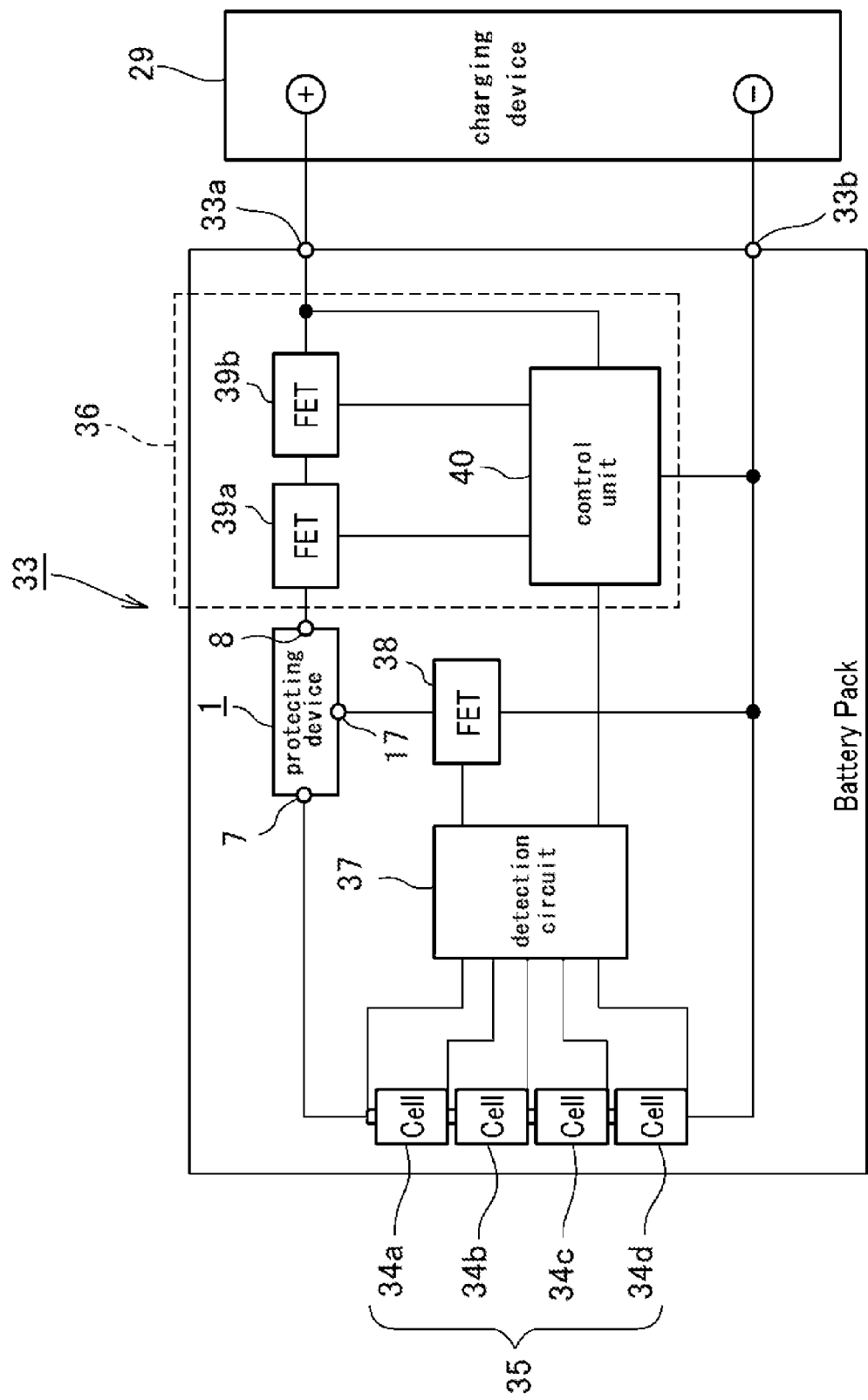
FIG. 12 is a circuit diagram illustrating an example of a configuration of a battery pack.

As shown in FIG. 12, such a protecting device 1 is used, e.g., in a circuit in a battery pack 33 of a lithium ion secondary battery. The battery pack 33 includes a battery stack 35 comprising, e.g., a total of four battery cells 34*a* to 34*d* of lithium ion secondary batteries.

The battery pack 33 includes: the battery stack 35; a charge/discharge control circuit 36 for controlling charge/discharge of the battery stack 35; the protecting device 1 according to the present technology for interrupting a charge/discharge path when the state of the battery stack 35 is abnormal; a detection circuit 37 for detecting the voltage of each battery cell 34*a* to 34*d*; and a current control element 38 serving as a switching element for controlling the operation of the protecting device 1 according to the detection result of the detection circuit 37.

In the battery stack 35, the battery cells 34*a* to 34*d* requiring control for protection from over-charging and over-discharging states are connected in series and are detachably connected to a charging device 29 via a positive electrode terminal 33*a* and a negative electrode terminal 33*b* of the battery pack 33, so as to apply charging voltage from the charging device 29. By connecting the positive electrode terminal 33*a* and the negative electrode terminal 33*b* to a battery-driven electronic device, the battery pack 33 charged by the charging device 29 can drive the electronic device.

The charge/discharge control circuit 36 includes two current control elements 39*a*, 39*b* connected in series in the current path between the battery stack 35 and the charging device 29, and a control unit 40 for controlling operations of the current control elements 39*a*, 39*b*. The current control elements 39*a*, 39*b* are formed of, for example, a field effect transistors (hereinafter referred to as FETs) and the control unit 40 controls the gate voltage to switch the current path of the battery stack 35 between a conducting state and an interrupted state in the charging and/or discharging direction. The control unit 40 is powered by the charging device 29 and controls the operation of the current control elements 39*a*, 39*b* in accordance with the detection result by the detection circuit 37 to interrupt the current path when over-discharging or over-charging occurs in the battery stack 35.

The protecting device 1 is connected in the charge/discharge current path between the battery stack 35 and the charge/discharge control circuit 36, for example, and the operation thereof is controlled by the current control element 38.

The detection circuit 37 is connected to each of the battery cells 34*a* to 34*d* so as to detect the voltage values of each of the battery cells 34*a* to 34*d* and supplies each of the voltage values to the control unit 40 of the charge/discharge control circuit 36. Furthermore, when an over-charging voltage or an over-discharging voltage is detected in any one of the battery cells 34*a* to 34*d*, the detection circuit 37 outputs a control signal for controlling the current control element 38.

When the detection signal output from the detection circuit 37 indicates a voltage exceeding a predetermined threshold value corresponding to over-discharging or over-charging state of the battery cells 34*a* to 34*d*, the current control element 38 such as an FET, for example, activates the protecting device 1 to interrupt the charging/discharging current path of the battery stack 35 without the switching operation of the current control elements 39*a*, 39*b*.

Figure 13:
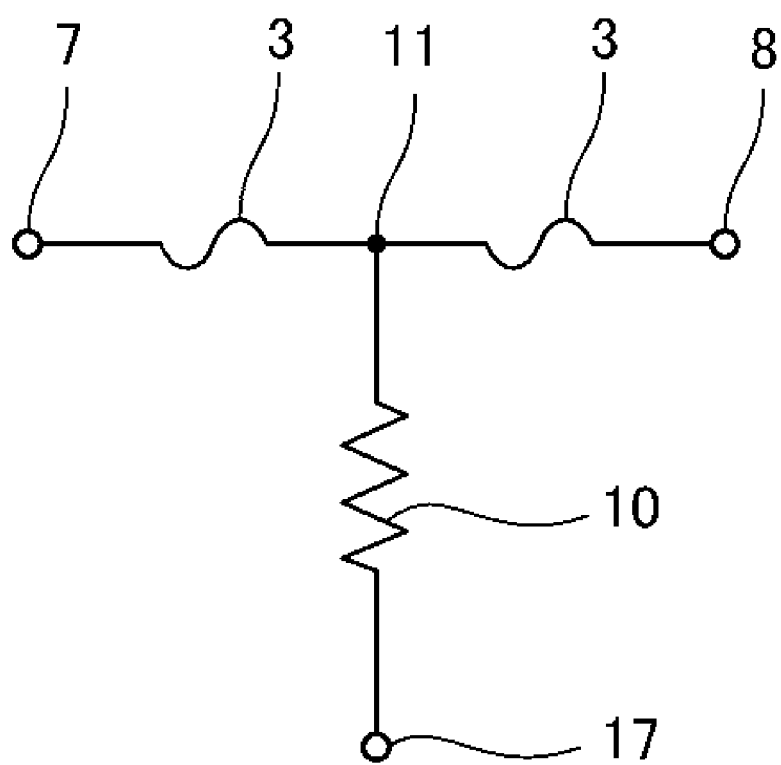
FIG. 13 is a circuit diagram of a protecting device according to the present technology.

The protecting device 1 according to the present technology, which is used in the battery pack 33 having the above-described configuration, has a circuit configuration as shown in FIG. 13. That is, in the protecting device 1, the first external connection terminal 7 is connected to the battery stack 35 side, and the second external connection terminal 8 is connected to the positive electrode terminal 33*a* side, whereby the meltable conductor 3 is connected in series in the charge/discharge path of the battery stack 35. Furthermore, in the protecting device 1, the heat-generator 10 is connected to the current control element 38 via the heat-generator feeding electrode 16 and the third external connection terminal 17, and the heat-generator 10 is also connected to the open end of the battery stack 35. As a result, one end of the heat-generator 10 is connected to one open end of the meltable conductor 3 and the battery stack 35 via the front surface electrode 11, and the other end is connected to the other open end of the current control element 38 and the battery stack 35 via the third external connection terminal 17. This forms a power supply path to the heat-generator 10 the conduction of which is controlled by the current control element 38.

Operation of Protecting Device

Upon detecting an abnormal voltage in any of the battery cells 34*a* to 34*d*, the detection circuit 37 outputs an interruption signal to the current control element 38. Then, the current control element 38 controls the current so as to energize the heat-generator 10. In the protecting device 1, an electrical current flows from the battery stack 35 to the heat-generator 10, and the heat-generator 10 starts heating. In the protecting device 1, the meltable conductor 3 is blown by the heat generation of the heat-generator 10 to interrupt the charge/discharge path of the battery stack 35. In the protecting device 1, by forming the meltable conductor 3 with a high melting point metal and a low melting point metal, the low melting point metal is melted before the melting of the high melting point metal, and the meltable conductor 3 can be blown in a short time by utilizing the erosive action on the high melting point metal by the melted low melting point metal.

Here, in the protecting device 1, the lower case 4 of the housing 6 supports the first side edges 2*c* of the insulating substrate 2 crossing the current flow direction of the meltable conductor 3 by the support portions 21, and the hollow portions 22 hold the second side edges 2*d* of the insulating substrate 2 in a bridge-like manner. Thus, the protecting device 1 can prevent heat generated by the heat-generator 10 provided on the surface of the insulating substrate 2 from being absorbed into the lower case 4 through the second side edges 2*d* of the insulating substrate 2. Therefore, the protecting device 1 can efficiently transfer the heat of the heat-generator 10 to the meltable conductor 3 to rapidly blow the meltable conductor 3. As a result, the protecting device 1 can suppress variation in the blowout time and stably blow the meltable conductor 3 in a short time.

Further, in the protecting device 1, the first side edges 2c of the insulating substrate 2 crossing the current flow direction of the meltable conductor 3 are supported by the lower case 4, so that the first side edges 2c of the insulating substrate 2 can promote heat dissipation and prevent wet spreading of the melted conductor to improve insulation properties.

In the protecting device 1, by blowing the meltable conductor 3, the power supply path to the heat-generator 10 is also interrupted, thereby stopping the heating of the heat-generator 10.

In addition, even when an overcurrent exceeding the rating is applied to the battery pack 33, the protecting device 1 can blow the meltable conductor 3 by self-heating to interrupt the charge/discharge path of the battery pack 33.

As described above, in the protecting device 1, the meltable conductor 3 is blown by heat generated in the energized heat-generator 10 or by self-heat generation of the meltable conductor 3 at the time of overcurrent. In this regard, since the meltable conductor 3 has a structure in which a low melting point metal is covered with a high melting point metal, the protecting device 1 can suppress deformation of the meltable conductor 3 even when the meltable conductor 3 is exposed to a high temperature environment such as when the meltable conductor 3 is reflow mounted on the first and second external connection terminals 7, 8 and the front surface electrode 11. Therefore, it is possible to prevent changes in blowout properties caused by changes in resistance values or other problems due to deformation of the meltable conductor 3, and to quickly blow the meltable conductor 3 by the predetermined overcurrent or the heat generation of the heat-generator 10.

The protecting device 1 according to the present technology is not limited to the cases where it is used for a battery pack of a lithium ion secondary battery and is of course applicable to various applications requiring interruption of a current path by an electric signal.

Modified Examples

Figure 14:
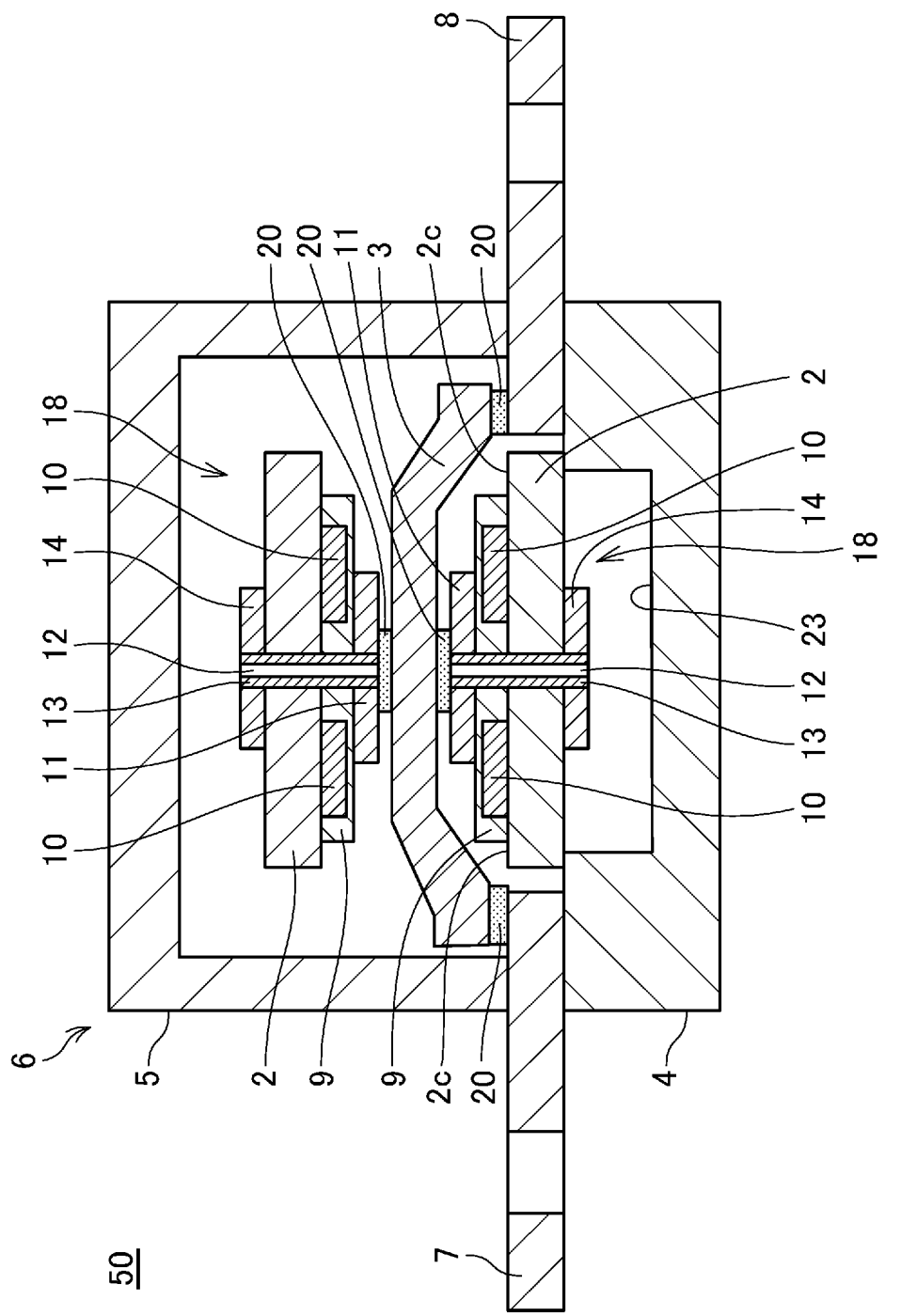
FIG. 14 is a cross-sectional view illustrating a modified example of a protecting device according to the present technology.
Figure 15:
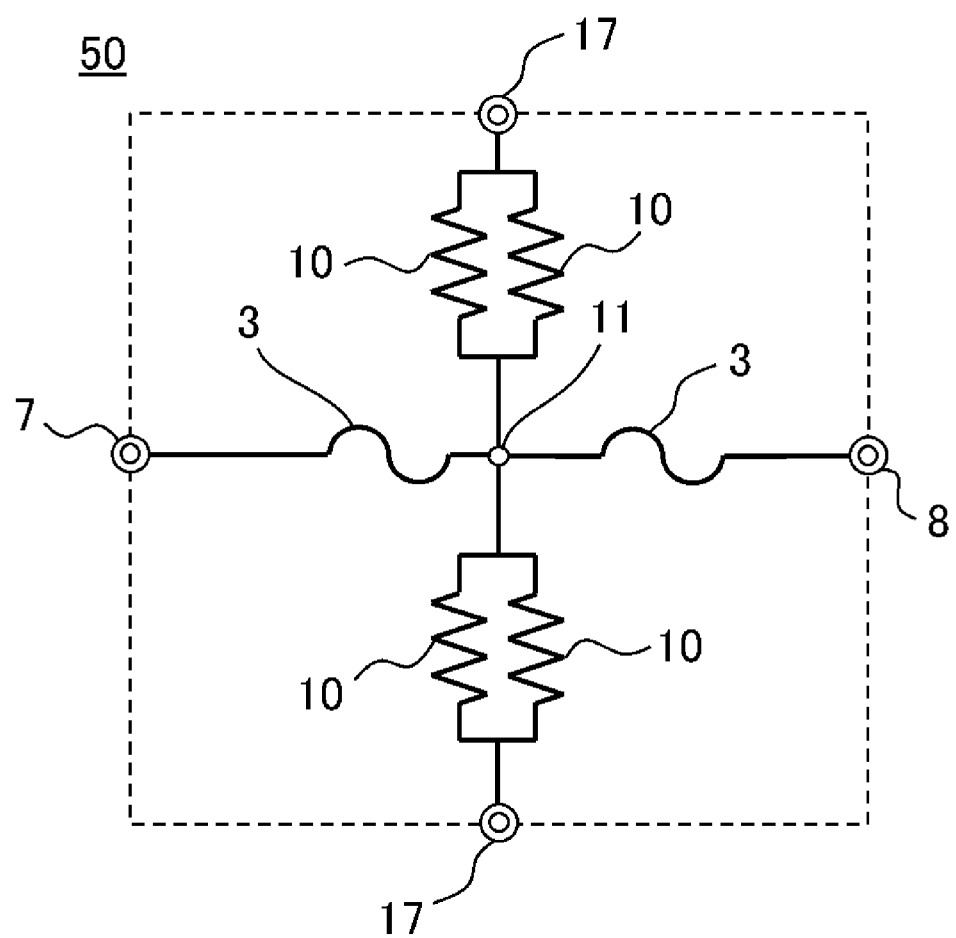
FIG. 15 is a circuit diagram of a protecting device according to a modified example.

Next, modified examples of the protecting device according to the present technology will be described. In the following description, the same components as those of the protecting device 1 described above may be denoted by the same reference numerals and the details thereof may be omitted. As shown in FIG. 14, a protecting device 50 according to the modified example may hold the meltable conductor 3 between a plurality of blowout members 18. In the protecting device 50 shown in FIG. 14, the blowout members 18 are disposed on one side and the other side of the meltable conductor 3, respectively. FIG. 15 is a circuit diagram of the protecting device 50. In each of the blowout members 18 respectively disposed on the front surface and the rear surface of the meltable conductor 3, one end of each of the heat-generators 10 is connected to the meltable conductor 3 via the heat-generator electrode 15 and the front surface electrode 11 formed on each insulating substrate 2, and the other end of each of the heat-generators 10 is connected to a power source for causing the heat-generators 10 to generate heat via the heat-generator feeding electrode 16 and the third external connection terminal 17 formed on each of the insulating substrates 2.

Figure 16:
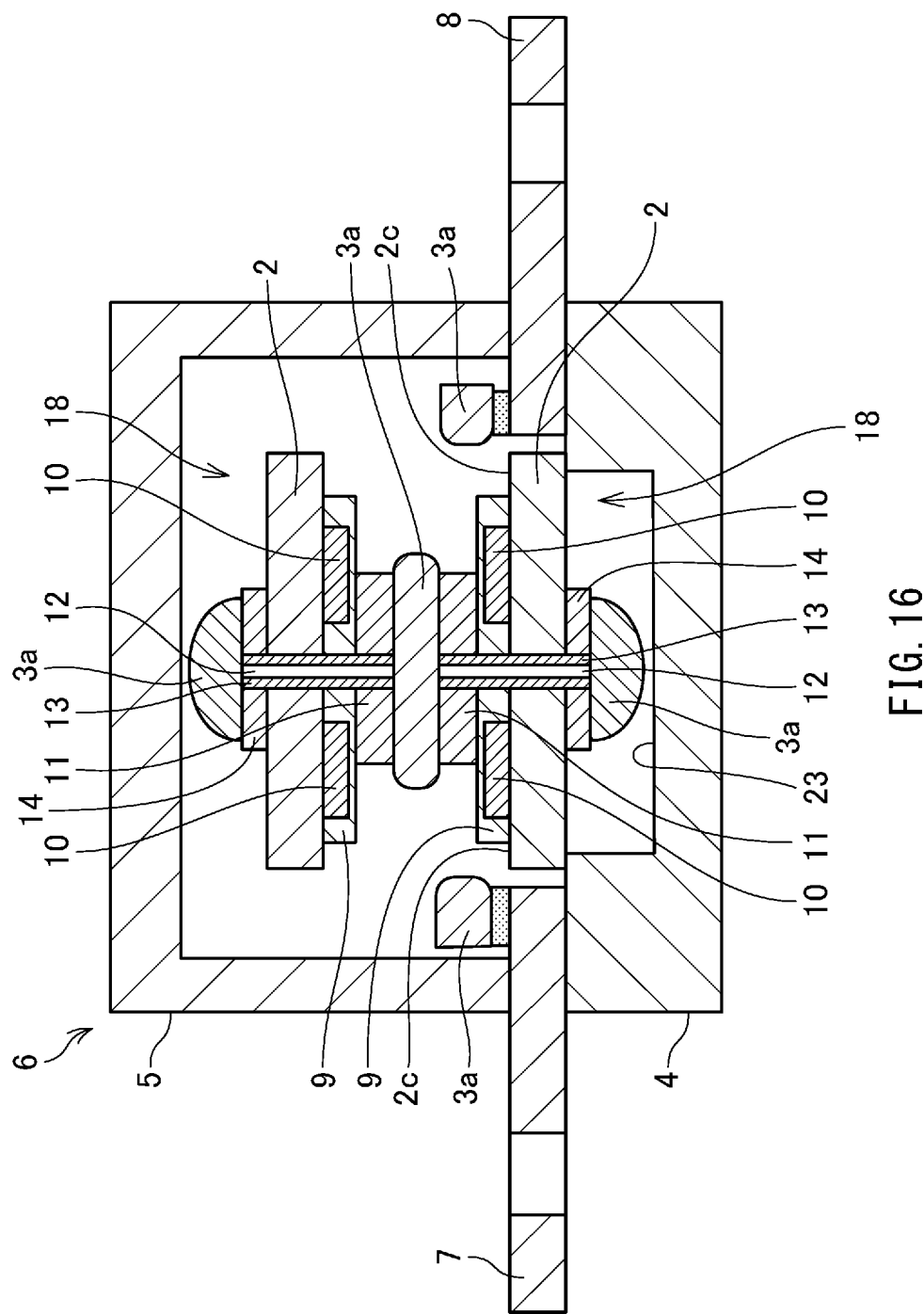
FIG. 16 is a cross-sectional view illustrating a state in which a meltable conductor is blown in a protecting device according to a modified example.
Figure 17:
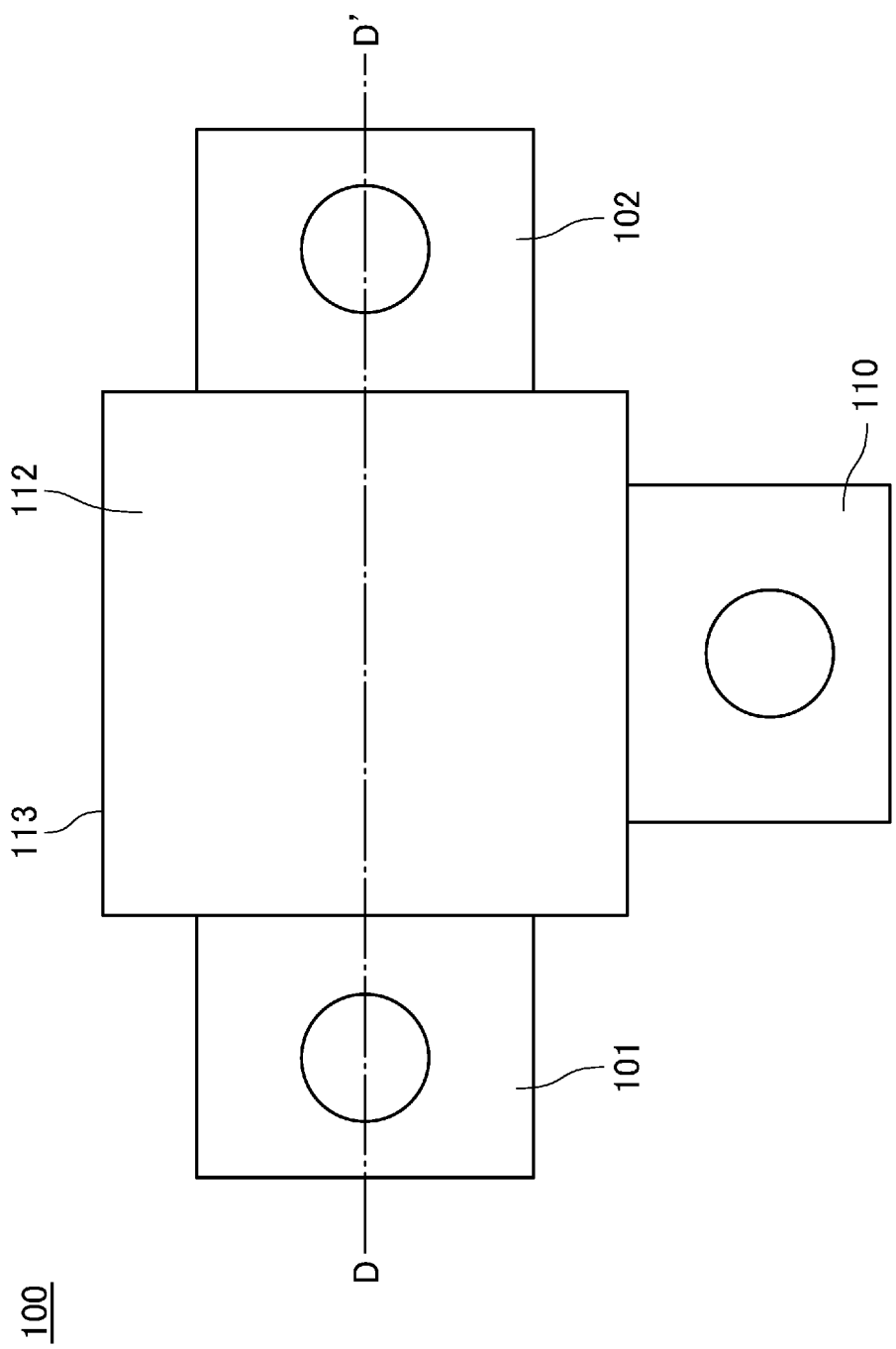
FIG. 17 is a plan view illustrating a protecting device compatible with a large current.
Figure 18:
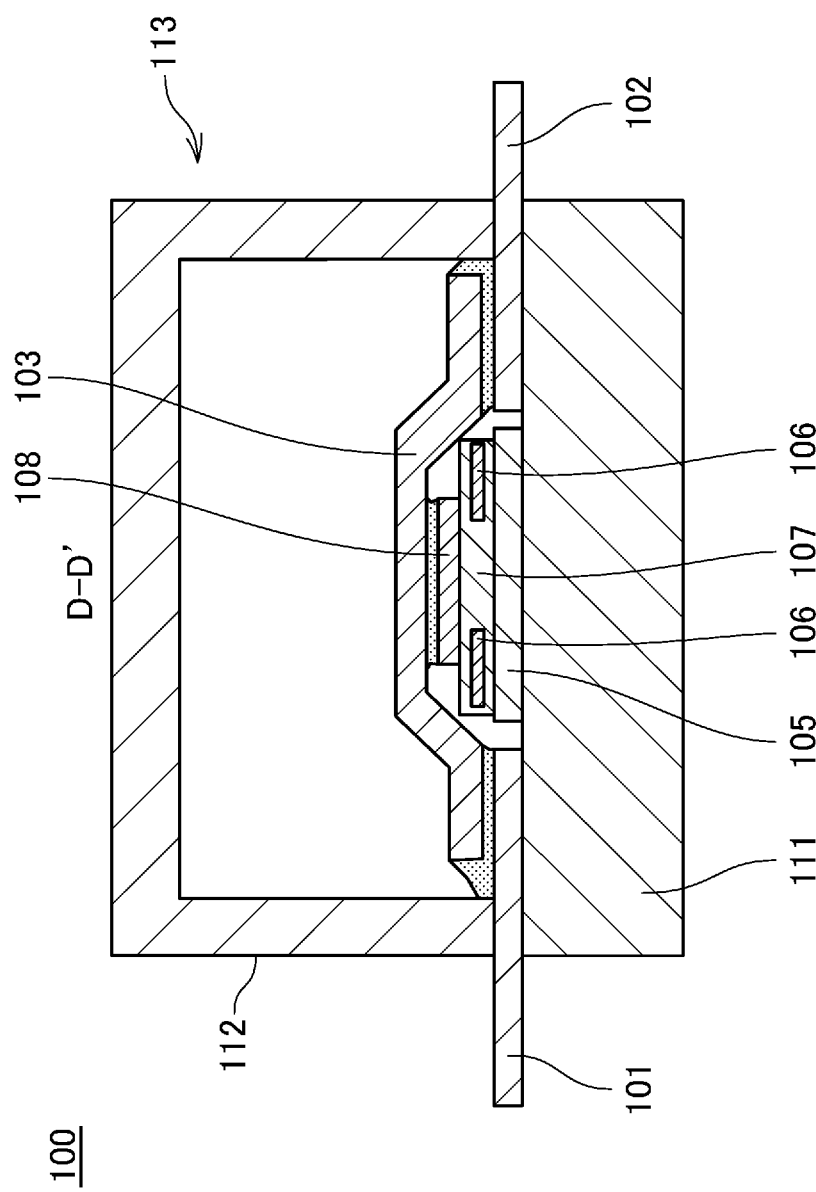
FIG. 18 is a cross-sectional view taken along line D-D' of FIG. 17.
Figure 19:
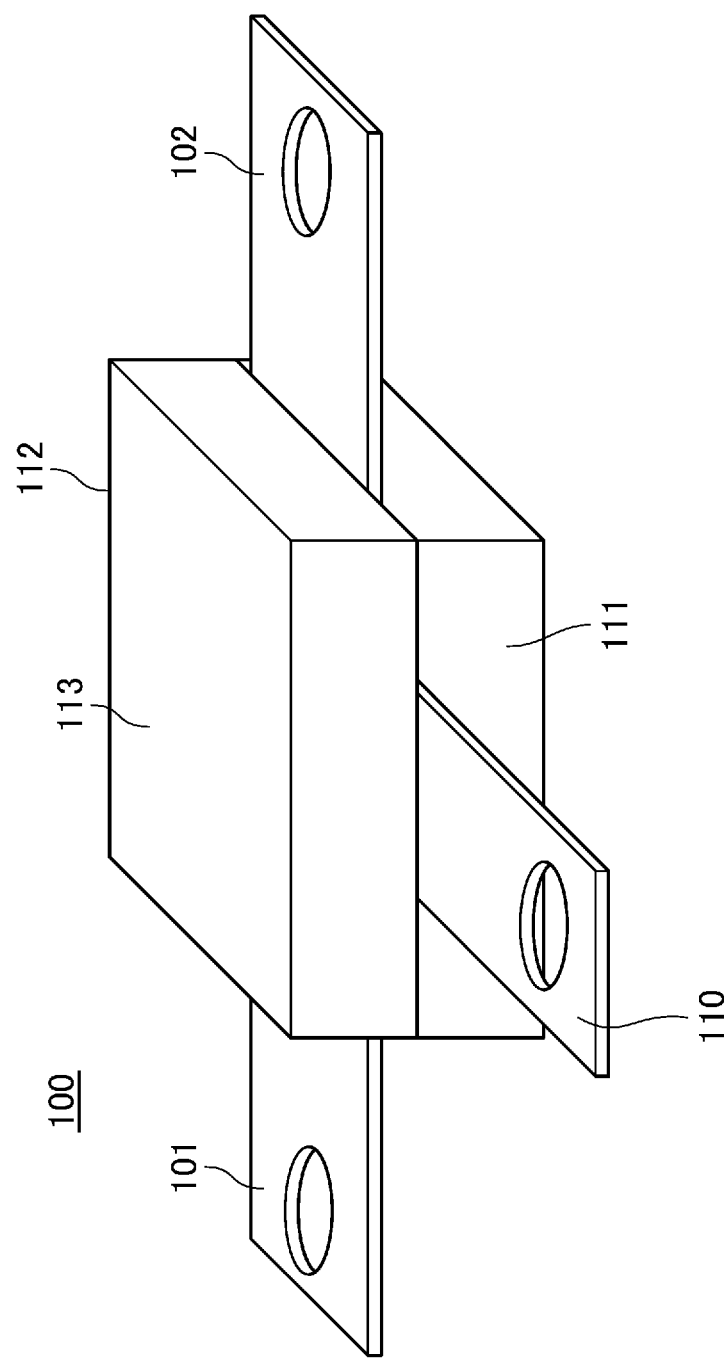
FIG. 19 is an external perspective view of the protecting device shown in FIG. 17.

As shown in FIG. 16, in the protecting device 50, when the meltable conductor 3 is to be blown by the heat generation of the heat-generator 10, the heat-generators 10 of the blowout members 18, 18 connected to both sides of the meltable conductor 3 heat both sides of the meltable conductor 3. Therefore, even when the cross-sectional area of the meltable conductor 3 is increased to be compatible with a large current application, the protecting device 50 can quickly heat and blow the meltable conductor 3.

The protecting device 50 sucks the melted conductor 3a from both sides of the meltable conductor 3 into each suction hole 12 formed in the insulating substrate 2 of the respective blowout members 18. Accordingly, even when the cross-sectional area of the meltable conductor 3 is increased in order to be compatible with a large current application so that a large amount of the melted conductor 3a is generated, the protecting device 50 can surely blow the meltable conductor 3 by sucking the melted conductor 3a into the plurality of blowout members 18. Further, the protecting device 50 can more quickly blow the meltable conductor 3 by sucking the melted conductor 3a into the plurality of blowout members 18.

The protecting device 50 can also quickly blow the meltable conductor 3 in a case where the meltable conductor 3 has a covering structure in which a low melting point metal constituting an inner layer is covered with a high melting point metal. In this case, even when the heat-generator 10 generates heat, it takes time for the meltable conductor 3 coated with the high melting point metal to be heated to a temperature at which the high melting point metal of the outer layer melts. Here, the protecting device 50 includes a plurality of blowout members 18 and simultaneously generates heat in the respective heat-generators 10 to quickly heat the high melting point metal of the outer layer to the melting temperature. Therefore, according to the protecting device 50, the thickness of the high melting point metal layer constituting the outer layer can be increased, and the rapid blowout property can be maintained while achieving higher rating.

As shown in FIG. 14, in the protecting device 50, it is preferable that the pair of blowout members 18, 18 connected to the meltable conductor 3 face each other. Thus, the protecting device 50 can simultaneously heat the same part of the meltable conductor 3 from both sides and suck the melted conductor 3a by the pair of the blowout members 18, 18 and can heat and blow the meltable conductor 3 more quickly.

In the protecting device 50, the front surface electrodes 11 formed on each of the insulating substrates 2 of the pair of blowout members 18, 18 are preferably face each other via the meltable conductor 3. Thus, since the pair of the blowout members 18, 18 are connected symmetrically, the load applied to the meltable conductor 3 does not become unbalanced in reflow mounting or the like, and resistance to deformation can be improved.

In any case where the heat-generator 10 is formed on the front surface 2a and the rear surface 2b of the insulating substrate 2, it is preferable to form the heat-generators on both sides of the suction hole 12 in order to heat the front surface electrode 11 and the rear surface electrode 14 and to aggregate and suck more amount of the melted conductor 3a.

Examples

Figure 20:
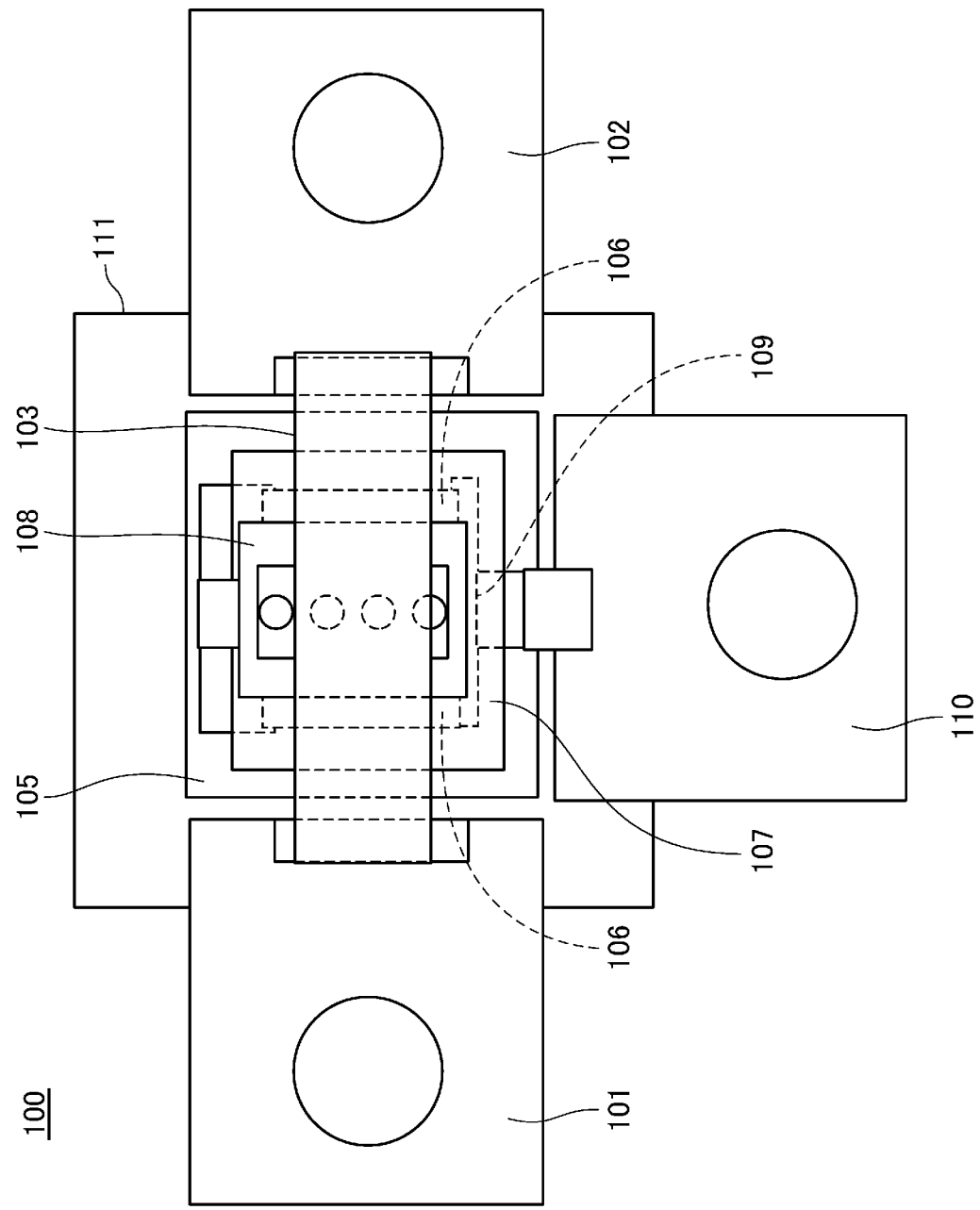
FIG. 20 is a plan view illustrating the protecting device shown in FIG. 17 with the upper case omitted.
Figure 21:
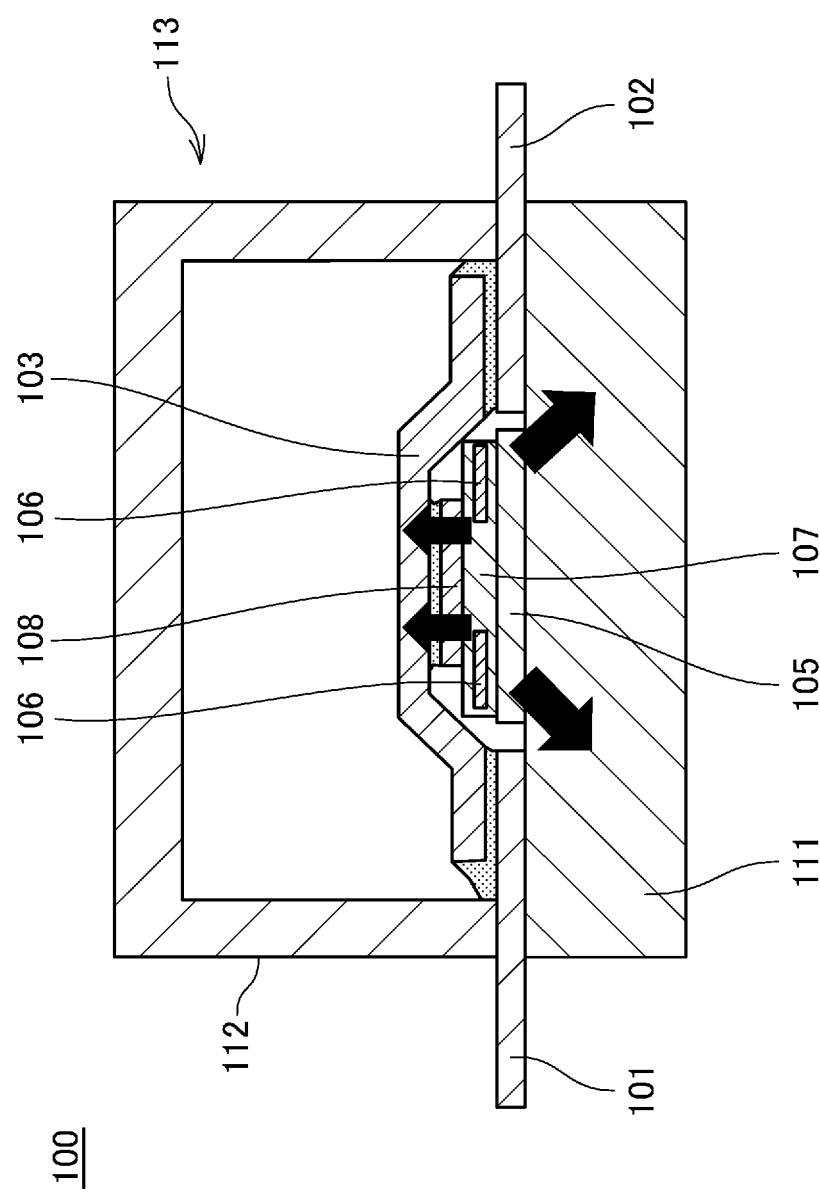
FIG. 21 is a cross-sectional view illustrating a heat dissipation path in the protecting device shown in FIG. 17.

Next, examples of the present technology will be described. As the examples, a protecting device according to the present technology (FIG. 3) and a protecting device having a conventional structure (FIG. 20) were prepared, both of which mounting the same meltable conductor. The rated current of the meltable conductor was 120 A for both protecting devices. The lower and upper cases of both protecting devices were formed with LCP (Liquid Crystal Polymer). After the same voltage (43 W) was applied to the heat-generators of both protecting devices, the blowout times of the meltable conductors were compared. The number of samples of both protecting devices was 25.

The result showed that the protecting devices according to the present technology had an average 10% faster blowout time than the protecting devices having the conventional structure. The variation in blowout times of the protecting devices according to the present technology was 30% more stable than those of the protecting devices having the conventional structure.

This reveals that the protecting device according to the present technology, which supports the first side edges 2c of the insulating substrate 2 by the support portions 21 provided on the lower case 4 and holds the second side edges 2d in a bridge-like manner by the hollow portions 22, can prevent the heat generated by the heat-generator 10 formed on the surface of the insulating substrate 2 from being absorbed into the lower case 4 via the insulating substrate 2, can efficiently transfer the heat of the heat-generator 10 to the meltable conductor 3, and can blow the meltable conductor 3 more quickly than the protecting device of the conventional structure. In addition, the protecting device 1 can suppress the variation in blowout time and can blow the meltable conductor 3 in a shorter time as compared with the protecting device of the conventional structure.

REFERENCE SIGNS LIST 1 protecting device, 2 insulating substrate, 2a front surface, 2b rear surface, 2c first side edge, 2d second side edge, 3 meltable conductor, 3a melted conductor, 4 lower case, 5 upper case, 6 housing, 7 first external connection terminal, 8 second external connection terminal, 9 insulating layer, 10 heat-generator, 11 front surface electrode, 12 suction hole, 13 conductive layer, 14 rear surface electrode, 15 heat-generator electrode, 16 heat-generator feeding electrode, 17 third external connection terminal, 18 blowout member, 20 bonding material, 21 support portion, 22 hollow portion, 23 recessed portion, 29 charging device, 31 low melting point metal layer, 32 high melting point metal layer, 33 battery pack, 33a positive electrode terminal, 33b negative electrode terminal, 34 battery cell, 35 battery stack, 36 charge/discharge control circuit, 37 detection circuit, 38 current control element, 39 current control element, 40 control unit, 50 protecting device, 100 protecting device

The invention claimed is:

1. A protecting device, comprising:
a meltable conductor; and
a housing including a lower case and an upper case, the housing being formed by joining the lower case and the upper case,
wherein the lower case is provided with a recessed portion formed therein and support portions provided at opposing side edges of the recessed portion,
further comprising:
an insulating substrate on which the meltable conductor is mounted,
wherein the support portions support first side edges of the insulating substrate crossing a current flow direction of the meltable conductor, and
wherein the recessed portion includes hollow portions at side edges substantially orthogonal to the opposing side edges on which the support portions are provided such that second side edges different from the first side edges of the insulating substrate are held in a bridge-like manner.

2. The protecting device according to claim 1, wherein the recessed portion is longer in a direction between the second side edges as compared with the distance between the second side edges of the insulating substrate, and
wherein the hollow portions hold the second side edges of the insulating substrate in the bridge-like manner above the recessed portion.

3. The protecting device according to claim 1, wherein the hollow portions are longer than a length of the second side edges of the insulating substrate in the current flow direction of the meltable conductor.

4. The protecting device according to claim 1, further comprising first and second external connection terminals connected to both ends of the meltable conductor.

5. The protecting device according to claim 1, wherein the insulating substrate comprises a heat-generator, an insulating layer covering the heat-generator, and a front surface electrode connected to one end of the heat-generator, provided on the insulating layer, and connected to the meltable conductor.

6. The protecting device according to claim 5, wherein the heat-generator is formed in a rectangular shape having a longitudinal direction intersecting with the current flow direction of the meltable conductor.

7. The protecting device according to claim 5, wherein the front surface electrode has a suction hole for sucking melted material of the meltable conductor.

8. The protecting device according to claim 5, wherein the heat-generator is provided at a front surface, a rear surface, or an inside of the insulating substrate.

9. The protecting device according to claim 5, further comprising a third external connection terminal connected to another end of the heat-generator.

10. The protecting device according to claim 5,
wherein the insulating substrate is part of a blowout member for blowing out the meltable conductor by heat generation of the heat-generator, and
wherein a plurality of the blowout members are connected to the meltable conductor.

11. A battery pack, comprising:
the protecting device according to claim 1.

12. The protecting device according to claim 1, wherein the support portions are respectively provided at the opposing side edges of the recessed portion and protrude from the opposing side edges to the inside of the recessed portion.

13. A protecting device, comprising:
a meltable conductor; and
a housing including a lower case and an upper case, the housing being formed by joining the lower case and the upper case,
wherein the lower case is provided with a recessed portion formed therein and support portions provided at opposing side edges of the recessed portion, and
wherein the support portions are respectively provided at the opposing side edges of the recessed portion and protrude from the opposing side edges to the inside of the recessed portion.

14. The protecting device according to claim 13, further comprising:

an insulating substrate on which the meltable conductor is mounted, wherein the support portions support first side edges of the insulating substrate crossing a current flow direction of the meltable conductor.

15. The protecting device according to claim 13, wherein the recessed portion includes hollow portions at side edges substantially orthogonal to the opposing side edges on which the support portions are provided such that second side edges different from the first side edges of the insulating substrate are held in a bridge-like manner.

16. The protecting device according to claim 13, wherein the recessed portion is longer in a direction between the second side edges as compared with the distance between the second side edges of the insulating substrate, and wherein the hollow portions hold the second side edges of the insulating substrate in the bridge-like manner above the recessed portion.

17. The protecting device according to claim 13, wherein the hollow portions are longer than a length of the second side edges of the insulating substrate in the current flow direction of the meltable conductor.

18. The protecting device according to claim 13, further comprising first and second external connection terminals connected to both ends of the meltable conductor.

19. The protecting device according to claim 13, wherein an insulating substrate comprises a heat-generator, an insulating layer covering the heat-generator, and a front surface electrode connected to one end of the heat-generator, provided on the insulating layer, and connected to the meltable conductor.

20. The protecting device according to claim 19, wherein the heat-generator is formed in a rectangular shape having a longitudinal direction intersecting with a current flow direction of the meltable conductor.

21. The protecting device according to claim 19, wherein the front surface electrode has a suction hole for sucking melted material of the meltable conductor.

22. The protecting device according to claim 19, wherein the heat-generator is provided at a front surface, a rear surface, or an inside of the insulating substrate.

23. The protecting device according to claim 19, further comprising a third external connection terminal connected to another end of the heat-generator.

24. The protecting device according to claim 19, wherein the insulating substrate is part of a blowout member for blowing out the meltable conductor by heat generation of the heat-generator, and wherein a plurality of the blowout members are connected to the meltable conductor.

25. A battery pack, comprising:

the protecting device according to claim 13.

* * * * *